(12) United States Patent
Versteeg et al.

(10) Patent No.: US 10,851,321 B2
(45) Date of Patent: Dec. 1, 2020

(54) REMOVAL OF SULFUR COMPOUNDS FROM GAS STREAMS VIA PRECIPITATION

(71) Applicant: PROCEDE HOLDING B.V., Enschede (NL)

(72) Inventors: Geert Frederik Versteeg, Enschede (NL); Wouter Nicolaas Wermink, Enschede (NL)

( * ) Notice: Subject to any disclaimer, the term of this patent is extended or adjusted under 35 U.S.C. 154(b) by 60 days.

(21) Appl. No.: 16/063,582

(22) PCT Filed: Dec. 19, 2016

(86) PCT No.: PCT/NL2016/050888
§ 371 (c)(1),
(2) Date: Jun. 18, 2018

(87) PCT Pub. No.: WO2017/105245
PCT Pub. Date: Jun. 22, 2017

(65) Prior Publication Data
US 2020/0063054 A1  Feb. 27, 2020

(30) Foreign Application Priority Data
Dec. 18, 2015 (CA) .................................. 2915860

(51) Int. Cl.
| | |
|---|---|
| *C10L 3/10* | (2006.01) |
| *B01D 53/52* | (2006.01) |
| *B01D 53/78* | (2006.01) |
| *B01D 53/96* | (2006.01) |

(52) U.S. Cl.
CPC .............. *C10L 3/103* (2013.01); *B01D 53/52* (2013.01); *B01D 53/78* (2013.01); *B01D 53/965* (2013.01); *B01D 2257/306* (2013.01); *B01D 2257/308* (2013.01); *C10L 2290/542* (2013.01)

(58) Field of Classification Search
CPC ......... C01B 17/04; C01B 17/16; C01B 3/102; C01B 3/103; B01D 53/1468; B01D 53/48; B01D 53/52; B01D 53/8603; B01D 53/96; B01D 2257/30; B01D 2257/304; B01D 2257/306; B01D 2257/308;
(Continued)

(56) References Cited

U.S. PATENT DOCUMENTS

| | | |
|---|---|---|
| 2,641,527 A | 6/1953 | Leutz |
| 3,014,785 A | 12/1961 | Muns et al. |
| 4,192,854 A | 3/1980 | Harvey et al. |

(Continued)

OTHER PUBLICATIONS

International Search Report and Written Opinion for PCT/NL2016/050888, dated Jun. 21, 2017, 22 Pages.

*Primary Examiner* — Timothy C Vanoy
(74) *Attorney, Agent, or Firm* — Brooks Kushman P.C.

(57) ABSTRACT

Techniques for removing sulfur compounds from a sulfur-containing gas stream can include contacting the gas with an absorption solution comprising a metal cation capable of reacting with the sulfur compound to form a metal sulphide precipitate and/or a metal mercaptide precipitate. In addition, the treatment can include controlling a concentration of the precipitates below a threshold to maintain rheological properties; subjecting the precipitate-enriched solution to vitalization; subjecting the precipitate-enriched solution to regeneration including oxidation; and/or other features to enhance the sulfur removal operations.

20 Claims, 14 Drawing Sheets

(58) Field of Classification Search
CPC ........ B01D 2258/0283; B01D 2258/05; B01D 2259/126
See application file for complete search history.

(56) References Cited

U.S. PATENT DOCUMENTS

| | | | | |
|---|---|---|---|---|
| 5,670,123 A | * | 9/1997 | Mileo | B01D 53/52 423/220 |
| 5,700,438 A | * | 12/1997 | Miller | B01D 53/48 423/225 |
| 5,753,189 A | * | 5/1998 | Rehmat | B01D 53/1418 422/110 |
| 2009/0118528 A1 | * | 5/2009 | Yang | B01D 53/02 556/113 |

\* cited by examiner

REMOVAL OF SULFUR COMPOUNDS FROM GAS STREAMS VIA PRECIPITATION

CROSS-REFERENCE TO RELATED APPLICATION

This application is the U.S. national phase of International Patent Application No. PCT/NL2016/050888 filed on Dec. 19, 2016, which claims priority to Canada Patent Application No. 2915860 filed on Dec. 18, 2015, the disclosures of which are incorporated in their entirety by reference herein.

TECHNICAL FIELD

The technical field relates to the removal of sulfur compounds, such as $H_2S$, COS and/or mercaptans, from gas streams such as those derived from shale gas, process gas, natural gas, biogas, and the like.

BACKGROUND

Various industrial gas streams include sufficient quantities of sulfur compounds requiring removal. Gas streams that can include shale gas, process gas, natural gas, and biogas, can be subjected to sulfur compound removal prior to further treating or using the gas. While certain sulfur compounds removal methods are known, there is still a need for techniques for the efficient and effective removal of sulfur compounds from gas streams as well as the handling of certain streams and materials derived from such removal operations.

SUMMARY

In some implementations, there is provided a process for removing sulfur compounds from a sulfur-containing gas stream, comprising in an absorption stage, contacting the sulfur-containing gas stream with an absorption solution comprising a metal cation capable of reacting with the sulfur compound to form a metal sulphide precipitate and/or a metal mercaptide precipitate, thereby producing a sulfur-depleted gas stream and a precipitate-enriched solution; recycling the precipitate-enriched solution back to the absorption stage, thereby accumulating metal sulphide precipitates in the absorption solution; and controlling a concentration of the metal sulphide precipitates present in the absorption solution below a threshold in order to maintain rheological properties of the absorption solution in the absorption stage.

In some implementations, the threshold is 5 wt %. In some implementations, the threshold is 4 wt %. In some implementations, the threshold is 3 wt %.

In some implementations, the metal cation comprises $Cu^{2+}$ and the metal sulphide comprises CuS.

In some implementations, the metal cation comprises a single type of cation.

In some implementations, the metal cation comprises multiple multiple types of cations that form multiple types of metal sulphide precipitates and/or metal mercaptide precipitates. In some implementations, the multiple types of cations comprise $Cu^{2+}$, $Zn^{2+}$, and $Ag^{2+}$.

In some implementations, the threshold is selected in order to inhibit a negative change in rheological behaviour of the absorption solution in the absorption stage.

In some implementations, the threshold is selected in order to inhibit substantial foaming of the absorption solution in the absorption stage.

In some implementations, the process further comprises adding a surface active agent to the absorption solution in order to raise the threshold compared to no surface active agent.

In some implementations, the step of controlling the concentration of the metal sulphide precipitates comprises: removing a bleed stream from the precipitate-enriched solution; and/or adding a make-up stream having a lower concentration of the metal sulphide into the absorption solution.

In some implementations, the precipitate-enriched solution is recycled directly back into the absorption stage without intervening separation steps.

In some implementations, the sulfur-containing gas stream comprises a low sulfur concentration, and is selected from shale gas, process gas, natural gas, and biogas.

In some implementations, the process further comprises controlling increases in acidity of the absorption solution by adding a base, such as caustic, to the absorption solution.

In some implementations, the sulfur compound comprises $H_2S$.

In some implementations, the sulfur compound comprises COS.

In some implementations, the sulfur compound comprises mercaptans.

In some implementations, there is provided a process for removing sulfur compounds from a sulfur-containing gas stream, comprising: in an absorption stage, contacting the sulfur-containing gas stream with an absorption solution comprising a metal cation capable of reacting with the sulfur compound to form a metal sulphide precipitate and/or a metal mercaptide precipitate, thereby producing a sulfur-depleted gas stream and a precipitate-enriched solution; subjecting the precipitate-enriched solution to vitalization to produce a vitalized absorption solution, the vitalization comprising adding a compound at conditions promoting formation and dissolution of additional metal cations, thereby producing the vitalized absorption solution; and returning at least a portion of the vitalized absorption solution into the absorption stage to form at least part of the absorption solution.

In some implementations, the compound comprises an oxide of the metal cation.

In some implementations, the compound comprises a sulphate of the metal cation.

In some implementations, the compound comprises a solid form of the metal of the metal cation in addition to $O_2$.

In some implementations, the metal cation comprises $Cu^{2+}$ and the metal sulphide comprises CuS.

In some implementations, the vitalization further comprises: separating the precipitate-enriched solution into a solids-enriched fraction and a solids-depleted stream; and adding the compound to the solids-depleted stream.

In some implementations, the compound is added along with water as a make-up stream.

In some implementations, the water in the make-up stream corresponds to a liquid loss in the solids-enriched fraction.

In some implementations, the separating is performed by filtration and the solids-enriched fraction is in the form of a filter cake.

In some implementations, the separating is performed in a decanter or settler.

In some implementations, the sulfur-containing gas stream comprises a high sulfur compound concentration.

In some implementations, the sulfur compound comprises $H_2S$.

In some implementations, the sulfur compound comprises COS.

In some implementations, the sulfur compound comprises mercaptans.

In some implementations, the metal cation comprises a single type of cation.

In some implementations, the metal cation comprises multiple multiple types of cations that form multiple types of metal sulphide precipitates and/or metal mercaptide precipitates.

In some implementations, the multiple types of cations comprise $Cu^{2+}$, $Zn^{2+}$, and $Ag^{2+}$.

In some implementations, there is provided a process for removing sulfur compounds from a sulfur-containing gas stream, comprising:
  in an absorption stage, contacting the sulfur-containing gas stream with an absorption solution comprising a metal cation capable of reacting with the sulfur compound to form a metal sulphide precipitate, thereby producing a sulfur-depleted gas stream and a precipitate-enriched solution, the absorption solution further comprising a second metal ion;
  subjecting the precipitate-enriched solution to regeneration to produce a regenerated solution, the regeneration comprising:
    adding an oxidizer to the precipitate-enriched solution, to increase the valence of the second metal ion;
    reacting the second metal ion in its higher valence state with at least a portion of the metal sulphide precipitate and/or the metal mercaptide precipitate to produce metal cations and sulphides and/or mercaptides;
  returning at least a portion of the regenerated absorption solution into the absorption stage to form at least part of the absorption solution.

In some implementations, the oxidizer comprise $O_2$. In some implementations, the $O_2$ is supplied as part of an air stream. In some implementations, the $O_2$ is a pure $O_2$ stream and/or from a membrane unit.

In some implementations, the oxidizer comprises $H_2O_2$.

In some implementations, oxidation occurs in an electrochemical cell by applying a potential over an anode compartment and a cathode compartment, separated by a membrane.

In some implementations, the second metal cation is oxidized to the higher valence state in the anode compartment, and protons move through the membrane to the cathode compartment, in which both hydrogen ions and metal cations can act as electron acceptors.

In some implementations, the second metal cation in the higher valence state is capable of oxidizing the metal sulphide(s) and/or metal mercaptide(s) in the anode compartment.

In some implementations, the metal cation comprises a single type of cation.

In some implementations, the metal cation comprises multiple multiple types of cations that form multiple types of metal sulphide precipitates and/or metal mercaptide precipitates.

In some implementations, the multiple types of cations comprise $Cu^{2+}$, $Zn^{2+}$, and $Ag^{2+}$.

In some implementations, there is provided a system for removing sulfur compounds from a sulfur-containing gas stream, comprising:
  an absorber, comprising:
    a gas inlet for receiving the sulfur-containing gas stream;
    a liquid inlet for receiving an absorption solution comprising a metal cation;
    an absorption column chamber for allowing contact of the sulfur-containing gas stream and the absorption solution, such that the metal cation reacts with the sulfur compound to form a metal sulphide precipitate and/or a metal mercaptide precipitate, thereby producing a sulfur-depleted gas stream and a precipitate-enriched solution;
    an accumulation chamber provided at a downstream end of the absorption chamber with respect to flow of the absorption solution, configured to receive and accumulate the precipitate-enriched solution, the accumulation chamber having a greater diameter than the absorption column chamber;
    a gas outlet for releasing the sulfur-depleted gas stream; and
    a liquid outlet provided in fluid communication with the accumulation chamber for releasing the precipitate-enriched solution; and
  a recycle system in fluid communication with the liquid outlet and the liquid inlet for recycling a stream derived from at least a portion of the precipitate-enriched solution back as at least part of the absorption solution supplied to the liquid inlet.

In some implementations, gas outlet is provided in fluid communication with either an upper part of the accumulation chamber in countercurrent operation, or in the accumulation chamber downstream in cocurrent operation, for releasing the sulfur-depleted gas stream.

In some implementations, the gas inlet and the liquid inlet are provided in fluid communication with an upper part of the absorption column chamber so as to flow co-currently within the absorption column chamber.

In some implementations, the system further includes a pump in fluid communication with the liquid outlet for receiving and pumping the precipitate-enriched solution; a heater provided in fluid communication with the liquid outlet for receiving and heating the precipitate-enriched solution; a bleed line in fluid communication with the liquid outlet for removing a bleed stream of the precipitate-enriched solution; a make-up line in fluid communication with the liquid outlet and/or liquid inlet for adding a make-up stream of the absorption solution; a pump-around system in fluid communication with the liquid outlet for receiving and returning at least a portion of the precipitate-enriched solution as a returned stream back into the accumulation chamber; and/or a control system configured to monitor and control a concentration of the metal sulphide precipitates present in the absorption solution below a threshold in order to maintain rheological properties of the absorption solution in the absorption column chamber and/or the accumulation chamber.

In some implementations, the system further includes a vitalization unit configured to add a compound at conditions promoting formation and dissolution of additional metal cations, thereby producing a vitalized absorption solution.

In some implementations, the system further includes a regeneration unit configured to add an oxidizer to the precipitate-enriched solution in the presence of a second metal ion, to increase the valence of the second metal ion, and to react the valence-increased second metal ion with the metal sulphide precipitate and/or the metal mercaptide precipitate to produce metal cations and sulphides and/or mercaptides, thereby producing a regenerated absorption solution provided to the recycle system.

In some implementations, there is provided a process or system for removing a sulphur contaminant from a gas stream, comprising one or more features as described above or herein (text and or figures).

In some implementations, there is provided a method for selectively removing sulphur and/or sulphur containing contaminant compounds from a gas flow, comprising: placing the gas flow into contact with a preselected metal ion solution, consisting of either one metal ion, or a mixture of metal ions, at a pH lying in the range of between about −1.0 and about 7.7, wherein the metal ion and the contaminants react together in order to form a solid metal salt of the contaminants which precipitates wherein the lower pH limit of about −1.0 substantially ensures that the metal salt formed between the metal ion and the contaminants substantially exclusively is precipitated, and wherein the upper pH limit substantially ensures that non-contaminants are not precipitated out of the gas flow as metal salts; and controlling a concentration of the solid metal salt present in the solution below a threshold in order to maintain rheological properties of the solution.

In some implementations, there is provided a method for selectively removing sulphur and/or sulphur containing contaminant compounds from a gas flow, comprising: placing the gas flow into contact with a preselected metal ion solution, consisting of either one metal ion, or a mixture of metal ions, at a pH lying in the range of between about −1.0 and about 7.7, wherein the metal ion and the contaminants react together in order to form a solid metal salt of the contaminants which precipitates wherein the lower pH limit of about −1.0 substantially ensures that the metal salt formed between the metal ion and the contaminants substantially exclusively is precipitated, and wherein the upper pH limit substantially ensures that non-contaminants are not precipitated out of the gas flow as metal salts; subjecting the solution comprising the solid metal salt to vitalization to produce a vitalized solution, the vitalization comprising adding a compound at conditions promoting formation and dissolution of additional metal cations, thereby producing the vitalized absorption solution; and returning at least a portion of the vitalized absorption solution into the absorption stage to form at least part of the absorption solution.

In some implementations, there is provided a method for selectively removing sulphur and/or sulphur containing contaminant compounds from a gas flow, comprising:

placing the gas flow into contact with a preselected metal ion solution, consisting of either one metal ion, or a mixture of metal ions, at a pH lying in the range of between about −1.0 and about 7.7, wherein the metal ion and the contaminants react together in order to form a solid metal salt of the contaminants which precipitates wherein the lower pH limit of about −1.0 substantially ensures that the metal salt formed between the metal ion and the contaminants substantially exclusively is precipitated, and wherein the upper pH limit substantially ensures that non-contaminants are not precipitated out of the gas flow as metal salts, the metal salt comprising metal sulphide precipitates and/or the metal mercaptide precipitates, wherein the preselected metal ion solution further comprises a second metal ion capable of changing in valence state under the influence of oxidation;
  subjecting the solution comprising the solid metal salt to regeneration to produce a regenerated solution, the regeneration comprising:
    adding an oxidizer to the solution comprising the solid metal salt, to increase the valence of the second metal ion; and
    reacting the second metal ion in the higher valence state, with the metal salt metal sulphide precipitates and/or the metal mercaptide precipitates to produce metal cations and sulphides and/or mercaptides; and
  returning at least a portion of the regenerated solution to form at least part of the solution contacted with the gas flow.

In some implementations, there is provided a method for selectively removing sulphur and/or sulphur containing contaminant compounds from a gas flow, comprising placing the gas flow into contact with a preselected metal ion solution, consisting of either one metal ion, or a mixture of metal ions, at a pH lying in the range of between about −1.0 and about 7.7, wherein the metal ion and the contaminants react together in order to form a solid metal salt of the contaminants which precipitates wherein the lower pH limit of about −1.0 substantially ensures that the metal salt formed between the metal ion and the contaminants substantially exclusively is precipitated, and wherein the upper pH limit substantially ensures that non-contaminants are not precipitated out of the gas flow as metal salts.

In some implementations, the gas flow contains $H_2S$ and/or COS and/or mercaptans as the sulfur compounds.

In some implementations, the gas flow further comprises $CO_2$.

In some implementations, the metal, which precipitates as a metal sulphide, is chosen such that the corresponding metal sulphide thereof is substantially non-soluble.

In some implementations, the metal, which precipitates as a metal sulphide, is chosen from the group substantially consisting of Zn, Fe, Cu, Ag, Pb, Cd, Co, Mg, Mn, Ni, Sn, Hg, and is preferably Fe, Zn or Cu.

In some implementations, the metal ion, or one of the metals in the metal ion mixture, can react with $H_2S$ and/or a metal sulphide to form sulphur.

In some implementations, the metal ion that reacts with $H_2S$ and/or a metal sulphide to form sulphur is preferably $Fe^{3+}$.

In some implementations, the mixture of metal(s) and acid is placed into contact with the gas flow in the form of an acidic aqueous salt solution. The acid is added to ensure the acidity of the solution, preferably being sulphuric acid.

In some implementations, the acidic aqueous metal salt solution is chosen from the group substantially consisting of metal nitrates, sulphates, phosphates, sulphites, nitrites, chlorides, bromides, iodides, fluorides, pyrophosphates and perchlorates and is most preferably a metal sulphate.

In some implementations, the metal sulphate is copper sulphate and/or iron sulphate and/or zinc sulphate.

In some implementations, when the metal comprises solely copper, a pH of about 7.7 or less is maintained, wherein the pH preferably lies in the range between about −1.0 and about 7.7.

In some implementations, the start pH on initially placing the gas flow in contact with the aqueous copper sulphate, or mixture of copper sulphate and iron sulphate and/or zinc sulphate, is above −1.0.

In some implementations, when the metal comprises solely zinc, a pH of about 6 or less is maintained.

In some implementations, when the metal comprises solely of iron, a pH of about 6.0 or less is maintained, wherein the pH preferably lies in the range between about −1.0 and about 6.0.

In some implementations, a buffer is added to the solution.

In some implementations, the method includes an initial or simultaneous step of transforming COS in the gas flow to $H_2S$, before the removal thereof by means of exposing the gas flow to a metal ion for converting COS into $H_2S$, preferably being a metal acetate compound, in particular being selected from the group consisting of zinc acetate and copper acetate.

In some implementations, unused, used, regenerated, and/or vitalized metal salt solution is fed back into the gas flow.

In some implementations, there is provided a system for performing one or more of the methods as described above, the system including a gas-liquid contactor in which the gas flow for cleaning can be brought into contact with the absorption solution; and a separation unit selected from a filter unit, a decanter unit, and/or a settler unit for separating the metal sulphide and/or mercaptide precipitates.

In some implementations, there is provided a method for selectively removing sulphur and/or sulphur containing contaminant compounds from a gas flow, comprising: placing the gas flow into contact with a preselected metal ion solution, consisting of either one metal ion, or a mixture of metal ions, at a pH lying in the range of between about −1.0 and about 7.7, wherein the metal ion and the contaminants react together in order to form a solid metal salt of the contaminants which precipitates wherein the lower pH limit of about −1.0 substantially ensures that the metal salt formed between the metal ion and the contaminants substantially exclusively is precipitated, and wherein the upper pH limit substantially ensures that non-contaminants are not precipitated out of the gas flow as metal salts; and wherein the solid metal salts are formed as particles under conditions such that the particles have a porosity of at least 50% and have a size, density and hydrophilicity sufficient to remain in suspension in the solution.

In some implementations, there is provided a process for removing sulfur compounds from a sulfur-containing gas stream, comprising: in an absorption stage, contacting the sulfur-containing gas stream with an absorption solution comprising a metal cation capable of reacting with the sulfur compound to form a metal sulphide precipitate, thereby producing a sulfur-depleted gas stream and a precipitate-enriched solution; providing operating conditions in the absorption stage such that the metal sulphide precipitate are formed as particles having a porosity of at least 50% and having a size, density and hydrophilicity sufficient to remain in suspension in the absorption solution.

In some implementations, the particles have a particle size distribution between about 0.1 µm and about 50 µm.

In some implementations, the metal salts comprise CuS.

In some implementations, there is provided a process for removing sulfur compounds from a sulfur-containing gas stream, comprising contacting the sulfur-containing gas stream with an absorption solution comprising a metal cation capable of reacting with the sulfur compound to form a metal sulphide precipitate and/or a metal mercaptide precipitate, thereby producing a sulfur-depleted gas stream and a precipitate-enriched solution, the precipitates being present in a concentration and having properties that would enable floating in the absorption solution.

In some implementations, the contacting is at least partly conducted in a packed column in which liquid phase flows as a liquid film over packing material and contacts a continuous gas phase.

In some implementations, the packed column is operated in counter-current operation.

In some implementations, the precipitate-enriched solution comprises a concentration of the precipitates above 3 wt %. In some implementations, the precipitate-enriched solution comprises a concentration of the precipitates above 4 wt %. In some implementations, the precipitate-enriched solution comprises a concentration of the precipitates above 5 wt %.

In some implementations, the contacting step is performed in a gas-liquid contactor operated to have a gas continuous phase and a liquid discontinuous phase.

In some implementations, the gas-liquid contactor comprise a packed column.

In some implementations, there is provided a process for removing sulfur compounds from a sulfur-containing gas stream, comprising:
contacting the sulfur-containing gas stream with an absorption solution comprising a metal cation capable of reacting with the sulfur compound to form a metal sulphide precipitate and/or a metal mercaptide precipitate, thereby producing a sulfur-depleted gas stream and a precipitate-enriched solution;
maintaining a concentration of the metal sulphide and/or a metal mercaptide precipitates below a threshold in order to maintain rheological properties of the absorption solution that inhibit floating of the precipitates in the absorption solution;
wherein the contacting comprises:
  supplying the sulfur-containing gas stream to a first stage gas-liquid contactor to contact a portion of the absorption solution and produce a pre-treated gas; and
  supplying the pre-treated gas to a second stage gas-liquid contactor to contact a second portion of the absorption solution and produce the sulfur-depleted gas stream.

In some implementations, the first stage gas-liquid contactor comprises a bubble-type contactor.

In some implementations, the second stage gas-liquid contactor comprises a packed reactor type contactor.

In some implementations, the bubble-type contactor comprises a mixing device to keep precipitates in suspension throughout the liquid volume.

In some implementations, the precipitate-enriched solution comprises a concentration of the precipitates below 3 wt %.

In some implementations, the precipitate-enriched solution comprises a concentration of the precipitates below 4 wt %.

In some implementations, the precipitate-enriched solution comprises a concentration of the precipitates below 5 wt %.

In some implementations, the methods, processes, and/or systems described above can have one or more additional features as described above and/or herein (text and/or figures).

DETAILED DESCRIPTION

Various implementations of removing sulfur compounds from gas streams will be described. While various implementations are described with respect to removing $H_2S$ in particular, it should be understood that various techniques described herein can be used or adapted for removing other sulfur compounds, such as COS, mercaptans, and the like.

In general, the $H_2S$ removal includes an absorption stage in which the $H_2S$-containing gas is contacted with a solution containing metal cations (e.g., such as $Cu^{2+}$) in order to form metal sulphide precipitates (CuS) that are carried with the solution. A precipitate-loaded solution and an $H_2S$-depleted gas are produced and withdrawn from the absorption stage. The precipitate-loaded solution can then be subjected to various downstream treatment operations, such as vitalization and/or regeneration, such that at least a portion of the solution can be recycled back to the absorption stage and various streams derived from the precipitate-loaded solution, containing sulfur- and metal-containing compounds, can be produced and removed.

Various implementations that are described herein may be referred to as the Vitrisol® process, and enable the removal of $H_2S$ from gas streams (e.g., natural gas, biogas, process gas, etc.). In an absorption stage, $H_2S$ is removed via a precipitation reaction with a metal ion in an acidic, aqueous solution forming a metal sulphide, thus depleting the active compound (metal cations) in the absorption solution. A vitalization stage can be incorporated into the process as well as a regeneration stage that can enable the oxidative regeneration of the precipitate-loaded solution. Based on experimental work and testing, the Vitrisol® process can be operated in a variety of manners. Leading factors determining the process design are the quantity of sulphur to be removed, as well as the composition and capacity of the gas to be purified. In addition, special conditions and design criteria imposed or desired by operators can also have an influence on process design.

Absorption Stage Implementations

Figure 1:
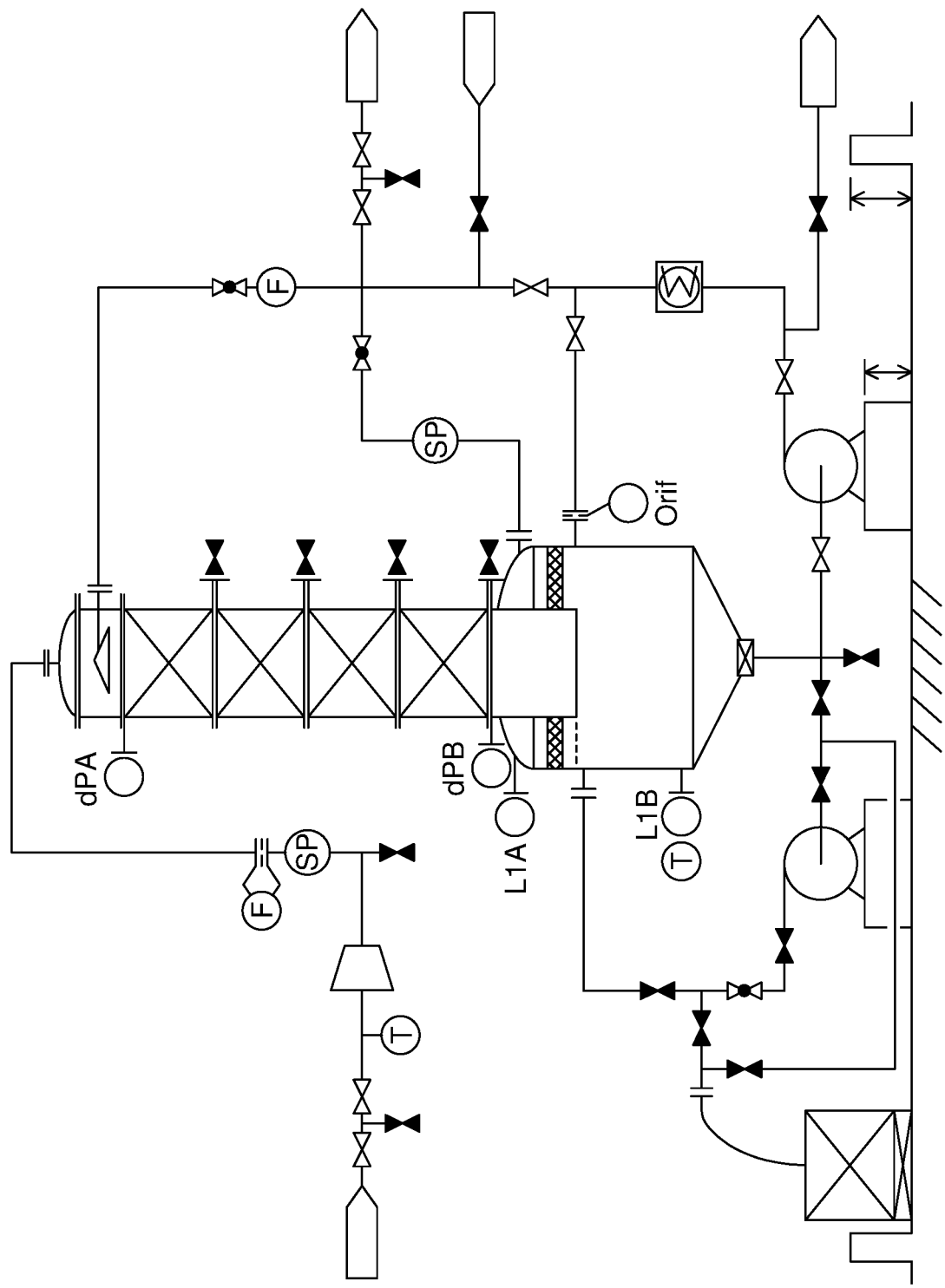
FIG. 1 is a process diagram illustrating an $H_2S$ removal stage.

Referring to FIG. 1, $H_2S$ can be removed from a gas stream via co-current operation in a gas-liquid contactor. The gas-liquid contactor, preferably a packed column, can be operated batch-wise with respect to the absorption solution (which may also be referred to generally as Vitrisol® liquid or solution). The packed column absorber can be mounted upon a storage vessel for the absorption solution. In some implementations, the process does not include regeneration of precipitate-loaded absorption solution, in which case therefore the solution consists essentially of $CuSO_4$, $H_2SO_4$ and $H_2O$, of course when $Cu^{2+}$ is employed as the metal cation. It should be noted that a variety of metal cations can be used for the removal of $H_2S$ or other sulfur compounds. During absorption, CuS is formed, which builds up in the absorption solution until a maximum wt % of approximately 3 wt % to 5 wt %. At higher CuS wt %, changes in rheological behaviour of the absorption solution occur, such as foaming which results in difficulties handling the absorption solution (e.g. with pumps). The process can thus be managed such that either the concentration of CuS remains below a threshold above which rheological problems occur, such as below 5 wt %, or a surface active agent is added to increase the threshold above which rheological problems occur. The threshold may be different depending on various process factors, the type of active compound that is used to form the sulfide precipitates, and/or the type of surface active agent used.

In some implementations, the process design is particularly advantageous and suited for the removal of low amounts of $H_2S$ from gas streams, in which the absorption solution can operate in a "stand-alone" fashion for several weeks to several months. One advantage of the process is its ability to provide high removal efficiencies, even when most of the active compound in the solution (e.g., $Cu^{2+}$) has been converted into CuS. The process can still provide consistent $H_2S$ removal efficiency during operation, with little to no decline in $H_2S$ removal efficiency. In some implementations, for every mole of $H_2S$ removed as a metal sulphide an equimolair amount of $H_2SO_4$ is formed. For the situation that pH control is desired, e.g. caustic and/or $CaCO_3$ can be added to the solution to counteract the increase in acidity of the solution.

It should be noted that the $H_2S$ absorption process can be carried out in various types of single or multi-stage gas-liquid contactors, such as a packed column, a tray column, a plate column, a bubble column, and so on. Each of the contactors of the absorption stage can be operated either co-currently, or counter-currently. In the absorption contactor, a gas flow can be contacted with the aqueous solution containing a pre-selected metal cation, such as $Cu^{2+}$. The metal cation reacts with $H_2S$ forming a metal sulphide precipitate, such as CuS, thus depleting the $H_2S$ from the gas flow. The metal cation can be provided by adding a metal salt, which can be selected from the group consisting of metal nitrates, sulphates, phosphates, sulphites, nitrites, chlorides, bromides, iodides, fluorides, pyrophosphates and perchlorates. In addition, in some implementations the absorption process is operated in the pH range of $-1.0<pH<14$, and preferably $-1.0<pH<7.7$. The boundaries ensure that substantially (and preferably exclusively) metal sulphide is precipitated, and that the metal cation will tend not to form precipitates with other compounds that could be present in both the gas phase and liquid phase (e.g., metal carbonates, metal oxides, etc.). As mentioned above, preferably $Cu^{2+}$ ions are used to precipitate $H_2S$ in the absorption liquid, although other metal ions may be used. In some implementations, metal cations could be used that either convert $H_2S$ to metal sulphides, and/or directly convert $H_2S$ to sulphur, i.e. no metal sulphide precipitate is formed but directly sulphur. Due to the possibility of operating the absorption process at lower pHs, the co-absorption of other acid gases, e.g. $CO_2$, will be minimized or even not occur. Therefore, the process can be designed and operated as such that $H_2S$ is selectively removed.

FIG. 1 illustrates a preferred process configuration and system structure including tanks, pumps, lines, valves, and associated equipment for the absorption operation. It should be noted that various other configurations and units may be used.

Vitalization Stage Implementations

Figure 2:
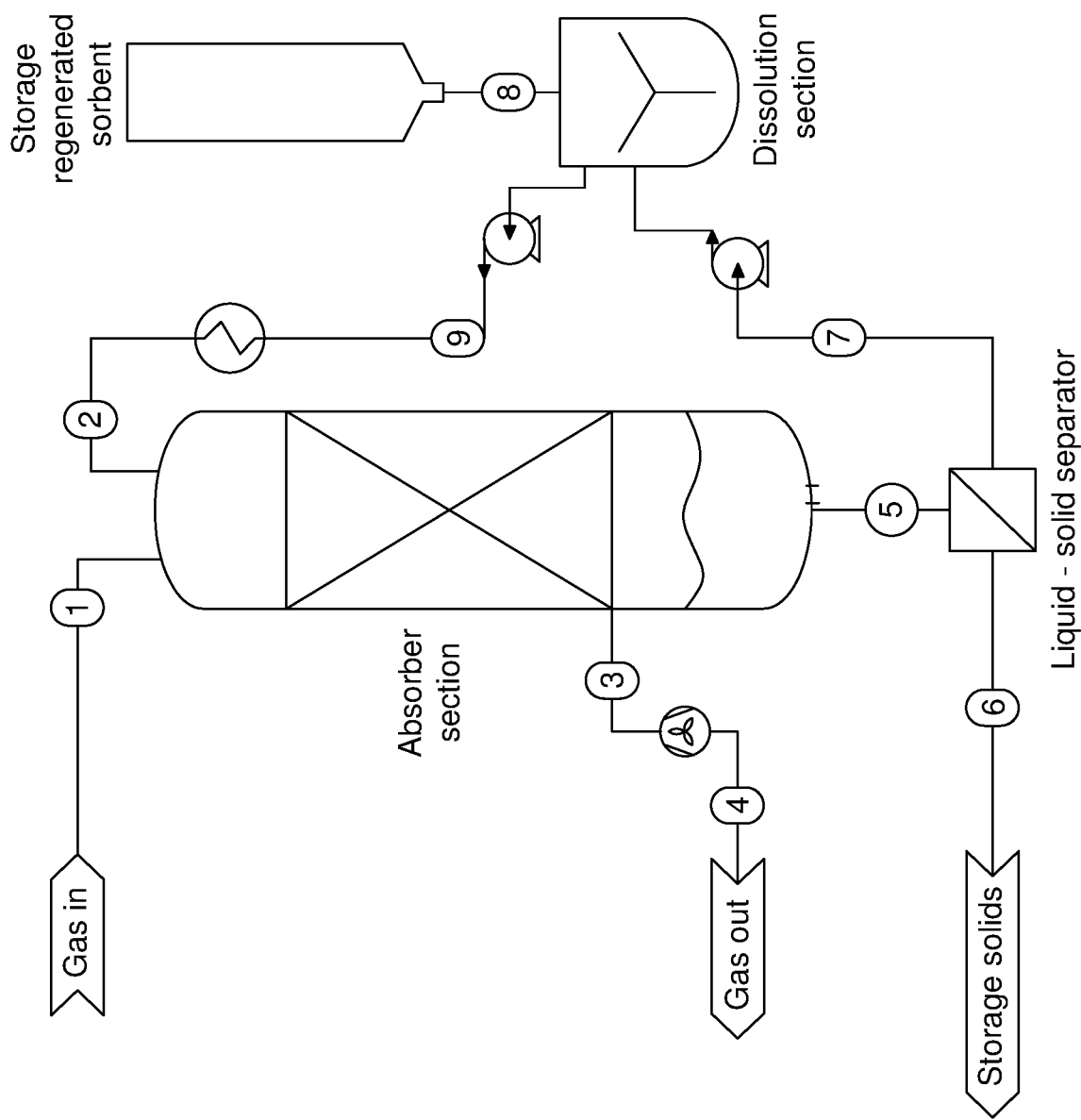
FIG. 2 is another process diagram illustrating an $H_2S$ removal stage and a vitalization stage.

Referring to FIG. 2, the process can also include a "vitalization" stage, which may also be referred to as a replenishment stage or a reactivation stage. In some implementations, the precipitate-loaded solution that is withdrawn from the absorption column is supplied to the downstream vitalization stage in which the active compound (e.g., metal cation) is added to the solution to produce a vitalized solution that can be returned to the absorption stage. The metal cation can be added in the form of the oxide of the respective metal, the solid form of the respective metal, and/or the metal salt, which can be selected from the group consisting of metal nitrates, sulphates, phosphates, sulphites, nitrites, chlorides, bromides, iodides, fluorides, pyrophosphates and perchlorates. When added in solid form the solid metal should be oxidized to its corresponding ion either chemically or electrochemically. It should be noted that the vitalization stage can be performed with or without removal of metal sulphide precipitates from the loaded solution produced in the absorption stage.

Referring to FIG. 2, in some implementations, $H_2S$ is removed from the gas stream via co-current operation in a packed column. The precipitate-containing absorption solution exiting the absorber can be treated in a solids separation step (e.g., decanter, candle filter, settler). The resulting absorption solution depleted in solids content is then supplied to a dissolution section to vitalize the solution, i.e., increase the $Cu^{2+}$ content and introduce make-up stream(s) for liquid lost in the CuS cake or solids fraction produced in the solids separation step. Vitalization can be performed preferably by dissolving either Cu(s) in the presence of $O_2$, dissolving Cu(s) electrochemically, by dissolving CuO, and/or by dissolving a copper sulphate salt. Because the $H_2SO_4$ concentration increases in the solution due to removal of $H_2S$ with $Cu^{2+}$, it is preferred to vitalize the solution by either dissolving Cu(s) in the presence of $O_2$, or by dissolving CuO. In both implementations, $H_2SO_4$ is involved in the dissolution reaction. When dissolving a copper sulphate salt, caustic can be used to neutralize the absorption solution.

In the process implementation of FIG. 2, no regeneration of the solution is provided; therefore the absorption solution consists essentially of $CuSO_4$, $H_2SO_4$ and $H_2O$, with the CuS that is formed in the process being continuously removed. The vitalization stage preferably includes the precipitate separation step and the metal cation addition step, although certain implementations could also include additional steps or could provide partial or no solids removal. The solids separation step can also be configured, for example by providing filter pore size or settler vessel parameters, such that an effective amount of the solids is removed without completely removing all of the solids. The solids separation step can be designed and operated to remove enough solids such that the addition of active compound can vitalize the solution sufficiently to enable a desired $H_2S$ removal according to the design and operation of the absorption stage.

Implementations of the process that incorporate a vitalization stage are advantageously suited for the removal of higher amounts of $H_2S$ from gas streams compared to batch-wise stand-alone operation illustrated in FIG. 1 where OPEX would result in higher costs due to higher $Cu^{2+}$ consumption in the process.

Regeneration Stage Implementations

The process can also include a regeneration stage that enables the regeneration of the precipitate-loaded solution, for example by oxidation. FIGS. 3 to 6 illustrate process configurations including a regeneration stage and additional processing units. Experimental data regarding oxidation reactions and downstream processing was collected, to obtain conversions and reaction times which resulted in kinetics, as well as solubilities; and experiments mimicking unit operations were performed. In some implementations, $O_2$ can be used as the oxidizer agent. In other implementations, $H_2O_2$ can be employed. In other implementations, electrochemical oxidation can be employed. In addition, various process configurations may be employed, as will be explained with reference to FIGS. 3 to 6.

Figure 3:
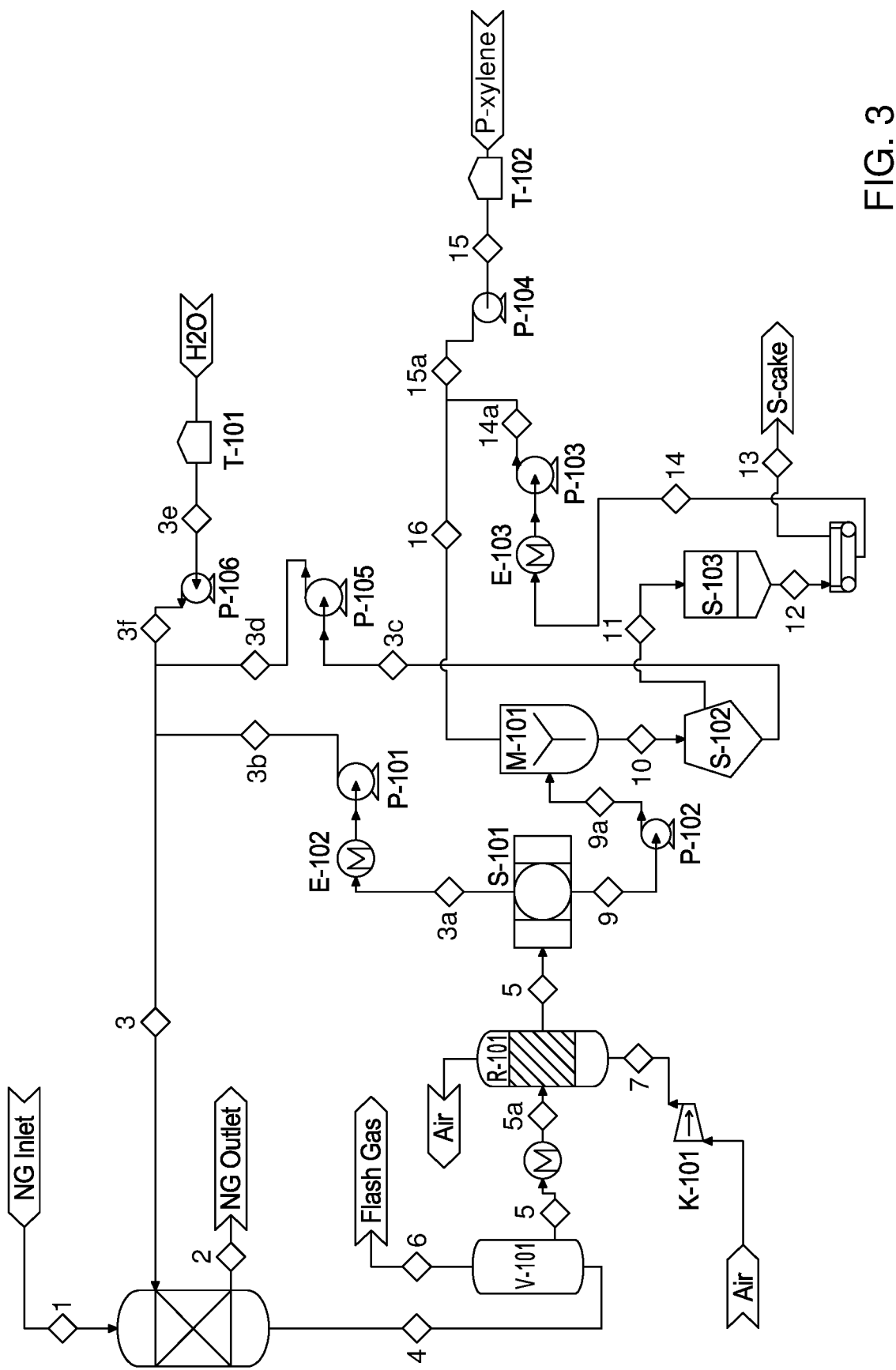
FIG. 3 is yet another process diagram illustrating an $H_2S$ removal stage and downstream processing units.

Referring to FIG. 3, the process may include regeneration of the absorption solution, meaning that CuS formed in the absorption stage is reconverted into $Cu^{2+}$ and sulphur in situ within the process. To enable the in situ conversion of CuS, a regeneration compound such as $FeSO_4$ is added to the solution. In the illustrated absorption stage, $H_2S$ is removed from natural gas via co-current operation in packed column C-101. Dissolved gas is removed from the precipitate-loaded solution in flash vessel V-101. The precipitate-loaded solution is then heated in a heater E-101 to the desired oxidation temperature for an oxidizer (also referred to as an oxidation unit) R-101. In the oxidizer, oxygen is supplied with compressed air from a compressor K-101 to enable the oxidation of $Fe^{2+}$ to $Fe^{3+}$. In turn, $Fe^{3+}$ oxidizes CuS to $Cu^{2+}$ and sulphur.

FIG. 3 shows that an oxidized stream is withdrawn from the oxidizer and the solids in the oxidized stream are separated with a suitable solids separation step (illustrated as S-101, e.g. decanter, candle filter, band filter). The regenerated absorption solution can then be returned to the absorber C-101, and the solids cake form in the separator S-101 can be supplied downstream for further processing.

Still referring to FIG. 3, sulphur in the solids cake can be dissolved in dissolution step M-101, using a suitable nonpolar solvent (e.g., $CS_2$, benzene, toluene, p-xylene, o-xylene, m-xylene). Subsequently, in separation step S-102 (e.g., settler) the nonpolar solvent is separated from the absorption solution liquid, which can be returned to the absorber C-101. The nonpolar solvent with dissolved sulphur recovered from the second separator S-102 can be routed to another separator that may be a crystallizer S-103. Sulphur crystals are removed from the nonpolar solvent, exiting the crystallizer, with a suitable solids separation step (illustrated as S-104, e.g. decanter, candle filter, band filter). The sulphur cake produced substantially comprises sulphur and nonpolar solvent. A continuous or intermittent make-up stream of nonpolar solvent from storage tank T-102 can be added to the sulphur dissolution vessel. Storage tank T-101 can provide water make-up when required.

Figure 4:
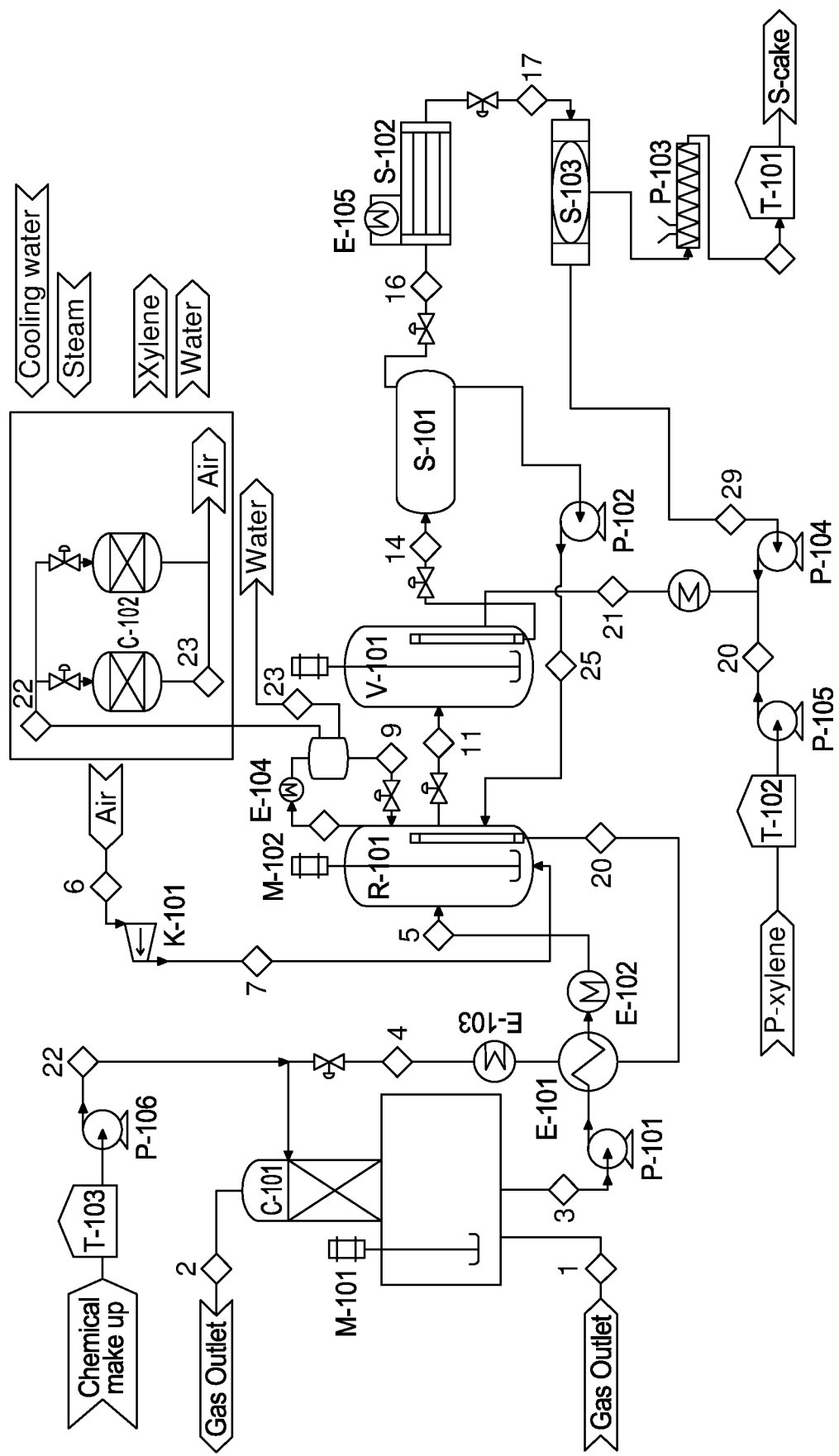
FIG. 4 is yet another process diagram illustrating an $H_2S$ removal stage and downstream processing units.

Referring now to FIG. 4, the process can include a regeneration stage in which candle filters are provided in oxidizer R-101 and extractor V-101 units. The process presented in FIG. 4 includes $H_2S$ removal from a gas stream via counter-current operation in an absorber in the form of a bubble column and a packed column (C-101). A stirrer M-101 is placed in the bubble column for the purpose of creating a generally homogeneous suspension. The precipitate loaded solution leaving the absorber is pumped through a heat exchanger E-101 and a heater E-102 to the oxidizer R-101. In the oxidizer R-101 the solution is contacted with a compressed air stream coming from compressor K-101, thus enabling the oxidation of $Fe^{2+}$ by oxygen and subsequently CuS by $Fe^{3+}$. As the oxidation of $Fe^{2+}$ is influenced by mass transfer of oxygen into the solution, a stirrer M-102 is introduced in the oxidizer to enhance mass transfer of oxygen to the solution. Candle filters in the oxidizer R-101 prevent solids (e.g., CuS and S) from leaving the oxidizer with the solution that is supplied back to the absorber. The solution entering the absorber contains $Fe^{3+}$, as $Fe^{3+}$ has been formed in the oxidizer. $Fe^{3+}$ also reacts in the absorber with either $H_2S$ and or CuS forming sulphur. The solution leaving the oxidizer is sent to the absorber via the heat exchanger E-101 and a cooler E-103 to cool the solution to absorber temperature. Nonpolar solvent, present or dissolved in the solution, is stripped in the oxidizer. Condenser E-104 cools the air stream leaving the oxidizer to a favorable temperature for adsorption of nonpolar sulphur solvent in adsorption beds C-102. Adsorbent is regenerated with steam.

Still referring to FIG. 4, a recycle stream leaves the oxidizer R-101 and is supplied to an extractor V-101. Despite the absence of oxygen, the oxidation of CuS can continue because of $Fe^{3+}$ in solution. Sulphur is dissolved in a nonpolar solvent entering the extractor from solvent tank T-102 and from solids separator S-103. Though the solubility is low, nonpolar solvent at least partially dissolves in the solution. Candle filters block possible solids from entering the downstream settler S-101. A stirrer M-103 is used to obtain a generally homogeneous suspension (solution, nonpolar solvent, CuS and S) within the extractor V-101, thus increasing the contact area between sulphur and nonpolar solvent and increasing mass transfer of sulphur into the nonpolar solvent. In settler S-101, nonpolar solvent and the solution are separated. The solution can then be pumped back to the oxidizer R-101, while nonpolar solvent with dissolved sulphur is supplied to a crystallizer S-102. In the crystallizer, nonpolar solvent is cooled and sulphur crystals are produced. Subsequently, the sulphur crystals are separated with a suitable solids separator (S-103, e.g. decanter, candle filter, band filter). A sulphur cake is obtained and routed to storage tank T-101. Nonpolar solvent from the solids separator, together with a nonpolar solvent make-up stream (coming from storage tank T-102), are pumped back to the extractor V-101 via heat exchanger E-106. When required, an absorption solution make-up stream can be added to the recycle line (from storage tank T-103).

Figure 5:
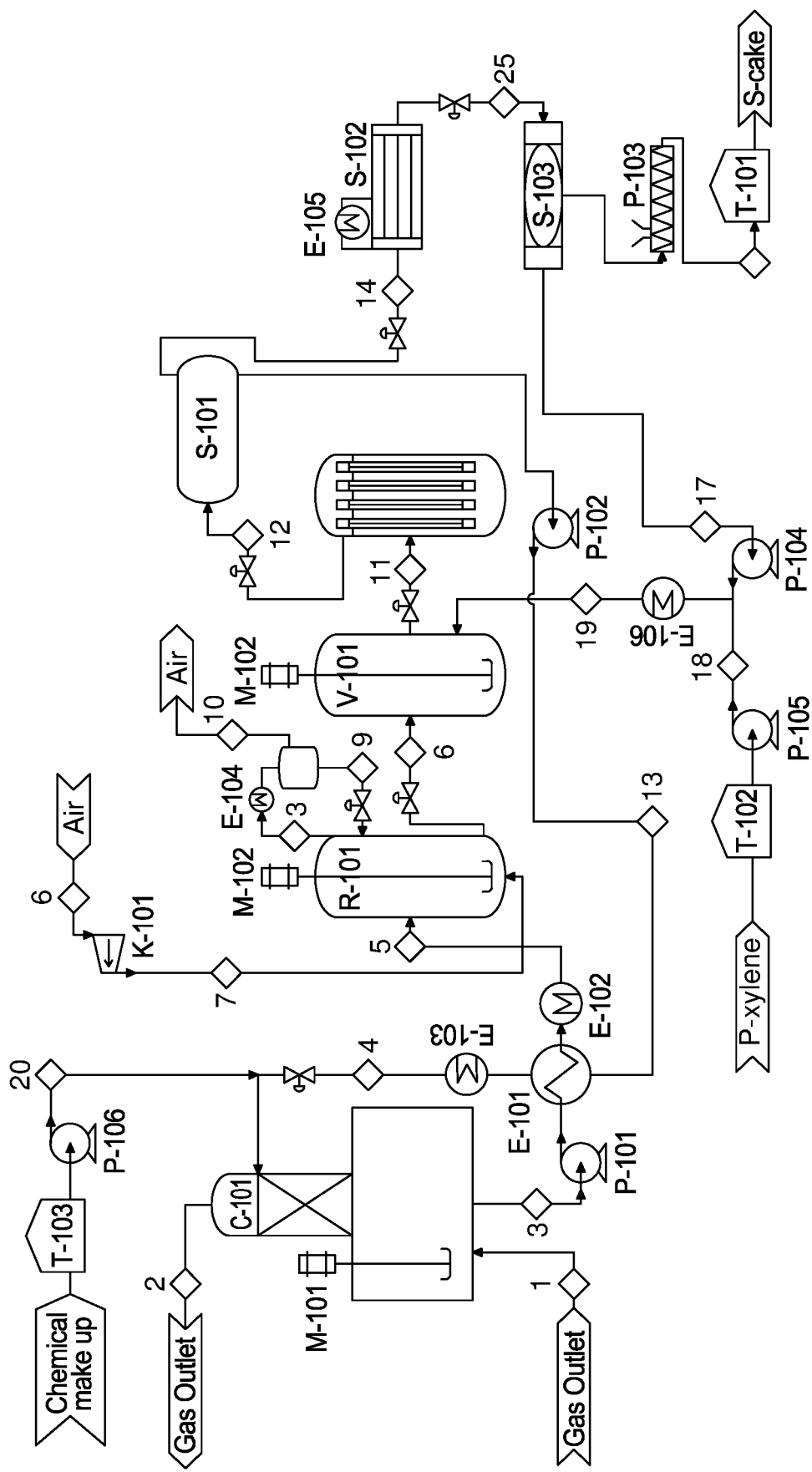
FIG. 5 is yet another process diagram illustrating an $H_2S$ removal unit and downstream processing units.

Referring to FIG. 5, the process can include a regeneration stage in which a candle filter is provided after an extractor. The process presented in FIG. 5 is a variation of the process illustrated in FIG. 4. The precipitated-enriched solution (e.g., absorption liquid containing CuS) leaving absorber C-101 (e.g., in countercurrent operation) is treated in oxidizer R-101 and subsequently the whole stream can be sent to an extractor V-101. In this scenario, no recycle streams are present over the oxidizer, and Vitrisol® liquid is not returned to the absorber from the oxidizer. A nonpolar solvent recycle enters the extractor to dissolve sulphur. In this scenario, in both unit operations, i.e. oxidizer and extractor, no candle filters are present. After the oxidizer and extractor steps, a candle filter ensures that no solids enter a settler S-101. Solids-free, regenerated absorption solution is returned to the absorber (with dissolved nonpolar solvent) and solids-free nonpolar solvent with dissolved sulphur enters the sulphur recovery steps. Sulphur is crystallized in a crystallizer S-102, and subsequently sulphur crystals are separated from the slurry with a suitable solids separator (S-103, e.g. decanter, candle filter, (vacuum) band filter). Nonpolar solvent coming from solids separator S-103, together with a make-up stream of nonpolar solvent, is pumped to the extractor. In a storage tank T-101, sulphur cake is stored. A make-up stream of nonpolar solvent is obtained from another storage tank T-102. A further storage tank T-103 can provide a Vitrisol® liquid make-up stream when required.

Figure 6:
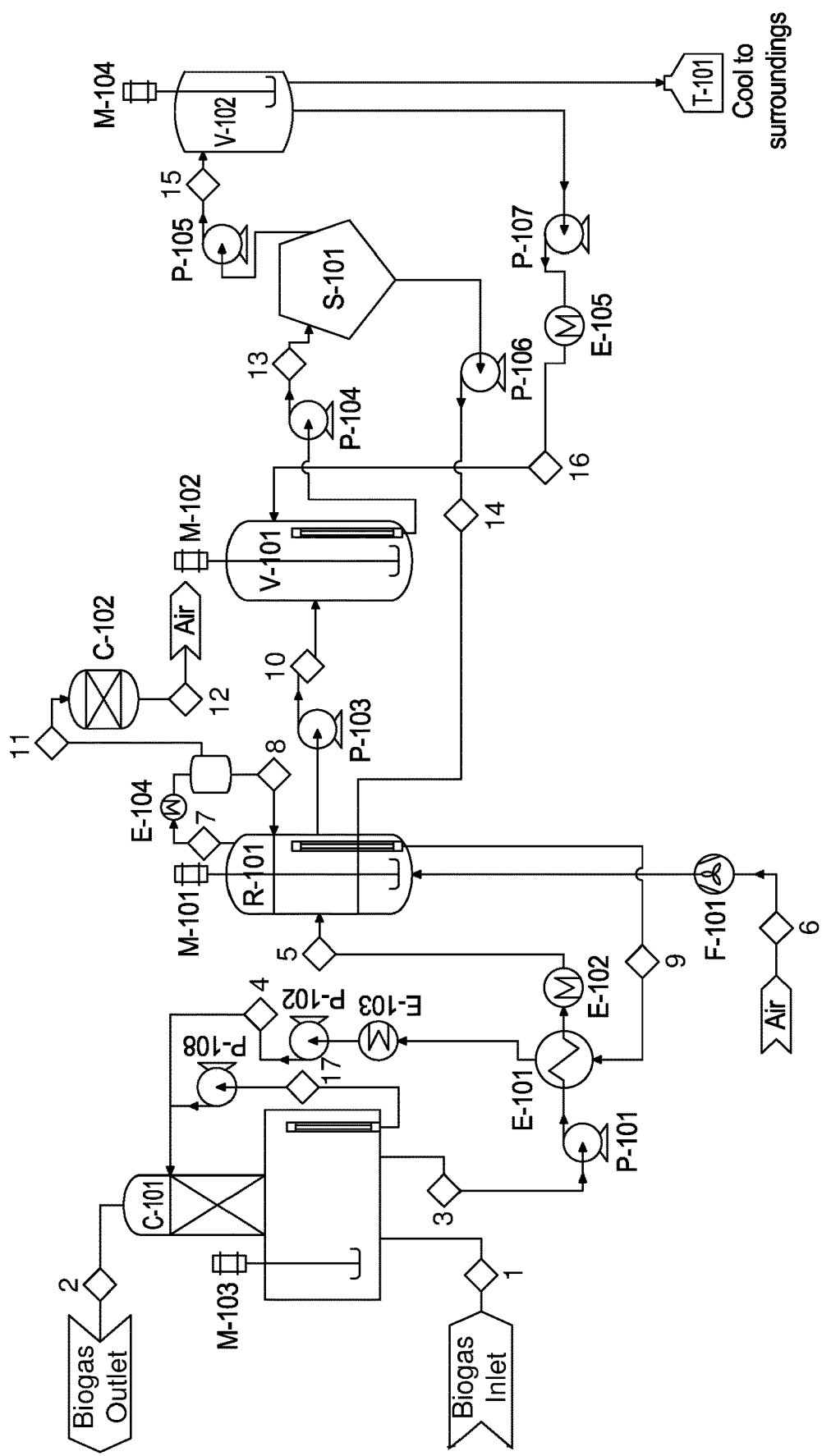
FIG. 6 is another process diagram illustrating an $H_2S$ removal unit and downstream processing units.

Referring now to FIG. 6, the process can include an absorption stage in which candle filters are provided in a bubble column, as well as candle filters in oxidizer R-101 and extractor V-101 units. The process presented in FIG. 6 is a variation of the process illustrated in FIG. 4. A liquid recycle over the absorber is introduced to provide enough liquid flow for improved wetting of the packing in the packed column. The candle filter in the bubble column blocks solids to ensure that the liquid recycle entering the top of the packed column is substantially solids free. This type of configuration can be chosen when a relatively small amount of liquid flow is required for the absorption of $H_2S$; however, the size of the gas flow is such that a relatively large column diameter, with respect to liquid flow, would be used. By increasing the liquid flow, the wetting of the packing improves and therefore mass transfer of $H_2S$ to the liquid phase is enhanced. The oxidizer R-101, extractor V-101 and settler S-101 configuration, including candle filters, as well as the configuration of adsorber C-102 for the removal of nonpolar sulphur solvent vapors, can be similar to the configuration shown in FIG. 4.

Still referring to FIG. 6, the nonpolar sulphur solvent leaving settler S-101 can be treated differently compared to the process shown in FIG. 4. Nonpolar solvent (partially) saturated with sulphur from settler S-101 enters a nonpolar sulphur solvent saturation vessel V-102. The batch of nonpolar solvent thus being present in the process is slowly saturated in time with sulphur due to continuous or intermittent operation. A stirrer M-104 ensures efficient mixing of the liquid phase. Periodically (partially) saturated nonpolar sulphur solvent can be removed from vessel V-102 to e.g. storage tank T-101, and "fresh" nonpolar solvent can be added to vessel V-102. Storage tank T-101, filled with (partially) saturated nonpolar solvent, can then be cooled to the surroundings so that sulphur crystals precipitate out of the nonpolar solvent. Afterwards, partially saturated nonpolar solvent can be reclaimed and sulphur crystals removed. Heater E-105 is introduced to counteract heat losses from the nonpolar solvent during operation, and to heat the nonpolar solvent during startup of the process.

Additional discussion of the Vitrisol® process with a regeneration step will now be presented. The "regeneration with $O_2$" downstream of the absorption generally refers to oxidizing the metal sulphide precipitate formed in the absorber, and returning the active compound (e.g., the metal ion) to the absorption solution. Subsequently, the regenerated absorption solution can be returned to the absorber. To be able to oxidize the metal sulphide, a second metal ion is placed in the Vitrisol® solution. This second metal ion is oxidized by $O_2$, and in turn the second metal ion in its higher valence state is able to oxidize the metal sulphide to release the active metal ion back in solution and produce solid sulphur (which can also be referred to as the regeneration of the Vitrisol® liquid).

Alternatively, the metal sulphide formed in the absorber can be oxidized through electrochemical oxidation. To be able to oxidize the metal sulphide, a second metal ion is placed in the Vitrisol® solution. This metal ion is oxidized in the anode compartment of an electrochemical cell. The respective ion, in its higher valence state, in turn oxidizes the metal sulphide. In the electrochemical cell, the anode compartment is separated from the cathode compartment by a membrane. Liquids can flow through each compartment either co-currently or counter-currently. A function of the membrane is to transfer protons and to retain solids and multivalent ions in solution. At the cathode hydrogen gas is formed.

In general, the Vitrisol® process with $O_2$ regeneration can be operated in at least two different manners with respect to CuS conversion. Subsequently, the process can be operated with or without sulphur removal from the Vitrisol® liquid and in at least two different manners when sulphur is extracted with a solvent. Certain possible implementations will be further described below.

With respect to CuS conversion, operation can be conducted at (I) at or close to 100% CuS conversion in the oxidation reactor(s), or (II) below 100% CuS conversion in the oxidation reactor(s). In some implementations, it is noted that $Fe^{2+}$ is the preferred second metal ion in solution.

In addition, it has been noted that the presence of the first metal ion (e.g., $Cu^{2+}$) can enhance oxidation of the second metal ion (e.g., $Fe^{2+}$) even when the first metal ion is present in quite low concentrations. In this regard, multiple types of first metal ions can be provided (e.g., a mixture of at least two of Cu2+, Zn2+, Ag2+, or others) such that one of such ions is provided to maximize the enhanced oxidation of the second metal ion while the other of such ions is provided as per the primary function described herein of forming the metal sulphide and/or mercaptide precipitates. In some scenarios, the oxidation-enhancing metal ion may be a more expensive material and is used in smaller quantities compared to the ion forming the majority of the sulphide/mercaptide precipitates.

For scenarios (I) with at or close to 100% CuS conversion in the oxidation reactor(s), the process may include one or more of the following aspects:
  a. After the oxidation step, return the Vitrisol® liquid with sulphur to the absorption column (batchwise operation of the Vitrisol® process with oxidation of CuS).
  b. After the oxidation step, separate sulphur from the Vitrisol® liquid via a suitable separation step (e.g. filtration, centrifugation, sedimentation). Afterwards, the Vitrisol® liquid is returned to the absorber.
    A make-up stream of Vitrisol® is required either continuously or continually to counteract the loss of Vitrisol® in the sulphur cake.
  c. After the oxidation step, separate sulphur from the Vitrisol® liquid via a suitable separation step (e.g. filtration, centrifugation, sedimentation). Afterwards, the Vitrisol® liquid is returned to the absorber, and the sulphur cake is extracted with a suitable nonpolar sulphur solvent (named S/L extraction). Subsequently, the sulphur is crystallized out in a crystallizer.
    i. The process can be operated with a separation step before the crystallizer (e.g. settler) to separate the Vitrisol from the sulphur solvent before the crystallizer. In this manner the Vitrisol slip in the sulphur cake can be returned to the absorber and Vitrisol® liquid losses are minimized.
  d. After the oxidation step, extract sulphur from the Vitrisol® liquid by contacting a suitable nonpolar sulphur solvent with the Vitrisol® liquid containing sulphur (named L/L extraction). Optionally either candle filters could be placed in the extraction step, or a candle filter operation is placed after the extraction step. Subsequently
    i. Separate the two liquid streams (e.g. settler); the Vitrisol liquid is returned to the absorber, the sulphur solvent is processed downstream in a crystallizer, and afterwards sulphur is separated (e.g. filtration, centrifugation, sedimentation). A make-up stream is required for the sulphur solvent due to losses in the sulphur cake.
      The sulphur cake can be further processed to pure sulphur with purities exceeding 99.9% in e.g. a sulphur smelter. The sulphur solvent can be fully reclaimed, making a make-up stream of sulphur solvent redundant.
      In case the nonpolar sulphur solvent dissolves in the Vitrisol liquid, and is stripped in the absorber, the gas exiting the absorber could be treated in an adsorber to remove the nonpolar sulphur solvent vapors. Optionally the nonpolar sulphur solvent adsorbed could be reclaimed.
    ii. Both streams are processed downstream in a crystallizer and afterwards sulphur is separated (e.g. filtration, centrifugation, sedimentation). Make-up streams are required for both the Vitrisol® liquid and the sulphur solvent. Afterwards the two liquid streams are separated (e.g. mixer settler); the Vitrisol® liquid is returned to the absorber, the sulphur solvent is returned to the sulphur extraction operation.
      The sulphur cake can be further processed to a sulphur higher in purity in e.g. a sulphur smelter. The sulphur solvent and water can be fully reclaimed, making a make-up stream of sulphur solvent redundant. Salts however could exit as impurity.
  e. Combine the oxidation of CuS with $O_2$ and L/L sulphur extraction in one oxidizer/extraction step. Subsequently either point d)i, or d)ii could be performed.
    i. The gas exiting the oxidizer/extraction step may contain nonpolar sulphur solvent vapors. These nonpolar sulphur solvent losses could be reclaimed by treating the gas in an adsorber.
    ii. In case the nonpolar sulphur solvent dissolves in the Vitrisol liquid, and is stripped in the absorber, the gas exiting the absorber could be treated in an adsorber to reclaim the nonpolar sulphur solvent.

For scenarios (II) with at or close to 100% CuS conversion in the oxidation reactor(s), the process may include one or more of the following aspects:
  a. During the oxidation of CuS in the presence of a second metal ion and oxygen both the CuS and the second metal ion oxidize (e.g., $Fe^{2+}$ to $Fe^{3+}$). By operating the oxidation step as such that enough $Fe^{3+}$ is formed to convert the remainder of CuS, no oxygen is required anymore to oxidize the CuS. From experimental work was observed that the order of reaction in $Fe^{3+}$, for the oxidation of CuS by $Fe^{3+}$, is zero when enough $Fe^{3+}$ is present for full conversion of CuS. Therefore at this point, the further oxidation of CuS can be performed in a subsequent step in the absence of oxygen, and can be operated in two manners:
    i. The process can be operated to 100% CuS conversion in a subsequent step
    ii. The process can be operated <100% CuS conversion in a subsequent step
    iii. The process operated till 100% conversion of CuS in a subsequent oxidizer/extraction step in the absence of oxygen can be operated in different manners.
      According to (I)a, (I)b, (I)c or (I)d.
      Combine the oxidation of CuS in the absence of $O_2$ with L/L extraction in one step. Subsequently either point (I)d.i or (I)d.ii could be performed.
      Either safeguard filter elements could be installed in the oxidizer/extraction step, or a safeguard candle filter operation subsequent to the oxidizer/extraction step could be installed, to prevent possible slip of CuS and/or sulphur. Further processing could be according to either point (I)d.i or (I)d.ii.

The process can be operated by two liquid streams exiting the oxidizer: a Vitrisol stream exiting the oxidizer and entering the absorber (exit optionally through a candle filter operation), and a split stream exiting the oxidizer to the oxidizer/extraction step. Vitrisol liquid returning to the absorber will contain $Fe^{3+}$ which could react with $H_2S$ in the absorber forming sulphur. Safeguard filter elements could be installed in the oxidizer/extraction step, or a safeguard candle filter operation subsequent to the oxidizer/extraction step could be installed, to prevent possible slip of CuS and/or sulphur. Afterwards, the nonpolar sulphur solvent phase is processed according to point (I)d.i. Point (I)d.i.2 will not occur as the nonpolar sulphur solvent is stripped in the oxidizer. Gas exiting the oxidizer could be treated in an adsorber to remove the nonpolar sulphur solvent vapors. Optionally the nonpolar sulphur solvent adsorbed could be reclaimed.

iv. The process operated till <100% conversion of CuS in a subsequent step in the absence of oxygen can be operated in different manners.

According to point (I)a, however the Vitrisol liquid contains both sulphur and CuS.

According to point (I)b, however sulphur and CuS are separated.

According to point (I)c, however sulphur and CuS are separated and the CuS can either be a. Separated from the Vitrisol/nonpolar solvent before the crystallization step and either returned to the CuS oxidation vessel in the absence of oxygen, or removed from the process.

b. Processed with the liquid stream in the crystallizer, and afterwards be separated together with the sulphur from the liquid stream.

According to point (I)d, however a. Regarding point (I)d.i: CuS present can separate over both liquid phases. Consequently part of the CuS is returned to the absorber, and part of the CuS is processed downstream with/without a mixer settler (to reclaim CuS) in the crystallizer and sulphur removal step.

b. Regarding point (I)d.ii: the sulphur cake will contain CuS when CuS is not separated before the sulphur removal step.

c. After the last CuS oxidation step any CuS remainder is separated (e.g. filtration, centrifugation, sedimentation) and returned to either the CuS oxidation step in the absence of oxygen, or the CuS oxidation step in the presence of oxygen. Further processing can be performed according to points (I)d.i and (I)d.ii.

Combine the oxidation of CuS in the absence of $O_2$ with UL extraction as well as the separation of CuS in one step, by e.g. installing a candle filter in the oxidizer/extraction step in the absence of oxygen. Subsequent separation of CuS is made redundant, however probably a backflush is required periodically to remove the CuS cake layer from the filter.

According to point (II).a.i.4.

The Vitrisol® process with $H_2O_2$ regeneration can be operated in a variety of different manners, similar to those described in the Vitrisol® process with $O_2$ regeneration. However, oxygen and the second metal ion are not required in this $H_2O_2$ regeneration process, and therefore the process can be operated in one oxidation step. Extraction can be performed through either S/L or L/L extraction. UL extraction can be performed either in the oxidizer, or in a subsequent step. One relevant factor is the water content of peroxide; generally the source of $H_2O_2$ is an aqueous solution of $H_2O_2$, therefore the water balance is a relevant parameter to control.

Optional Implementations and Features

In some scenarios, the process may have one or more of the additional features and/or steps listed below:

- The CuS formed in the absorber is a highly porous material with a particle size of $1<D_P<20$ μm.
- Choose the second polyvalent metal ion (required for the oxidation of the metal sulphide) as such that the oxidation of this ion to its higher valence state is enhanced by the first metal ion in solution, responsible for the removal of $H_2S$, e.g. $Cu^{2+}$ is the metal ion in solution for the removal of $H_2S$ which enhances the oxidation rate of $Fe^{2+}$ (the second polyvalent metal ion) with oxygen (Vitrisol® with $O_2$ regeneration).
- The second metal salt, required for the oxidation of the metal sulphide, can be selected from the group consisting of metal nitrates, sulphates, phosphates, sulphites, nitrites, chlorides, bromides, iodides, fluorides, pyrophosphates and perchlorates.
- For the situation in which $Cu^{2+}$ is the metal ion in solution for the removal of $H_2S$, and $Fe^{2+}$ is second polyvalent metal ion in solution, in order to increase the oxidation rate of $Fe^{2+}$ with oxygen it is preferred to increase the $Fe^{2+}$ concentration instead of the $Cu^{2+}$ concentration as $Fe^{2+}$ enhances the $Fe^{2+}$ oxidation rate more substantially compared to $Cu^{2+}$ (Vitrisol® with $O_2$ regeneration).
- For the situation of $Cu^{2+}$, $Fe^{2+}$ and CuS, all the sulphur formed during oxidation with oxygen is formed as a solid, no sulphur dissolves in the Vitrisol® liquid (Vitrisol® with $O_2$ regeneration). Therefore, it can be decided to either extract the sulphur by UL extraction, or by first separating the solids and contacting the solids with a suitable nonpolar sulphur solvent. Whichever operation is dependent on the case/mass balance.
- For the situation $Cu^{2+}$, $Fe^{2+}$, CuS and oxygen, the major part of the CuS oxidation (when sufficient $k_l a$ is ensured) follows the initial oxidation rate of $Fe^{2+}$ under the same experimental settings, when no $Fe^{3+}$ is present (Vitrisol® with $O_2$ regeneration).
- When oxidizing CuS with $Fe^{3+}$ under a nitrogen blanket, 100% conversion can be achieved.
- The $H_2S$ absorption step should be operated as such that preferably a liquid is obtained with CuS solids content of 0<wt %<50, more preferably 0<wt %<10 and more preferably 0<wt %<5. Too high solids content leads to dramatic changes in the rheological behaviour of the Vitrisol® liquid.
- The absorption process can be operated either cocurrently or countercurrently. Due to the nature of the $Cu^{2+}+H_2S$ reaction being an instantaneous precipitation reaction at the G/L interface, the rate of transfer of $H_2S$ in the liquid is dependent on gas phase mass transfer.

The CuS solid structure, i.e. the particle size, as well as the porosity, provides a substantial solid surface readily available for oxidation by $Fe^{3+}$. Therefore high CuS oxidation rates are achieved (Vitrisol® with $O_2$ regeneration).

$Fe^{3+}$ inhibits the oxidation of $Fe^{2+}$ with oxygen in the presence of $Cu^{2+}$ (Vitrisol® with $O_2$ regeneration).

The CuS oxidation reaction in the presence of $Fe^{2+}$, $Fe^{3+}$, $Cu^{2+}$ and oxygen is preferably carried out in the temperature range of 5 to 155° C., more preferably 50 to 120° C. and more preferably 70 to 95° C. (Vitrisol® with $O_2$ regeneration).

Increasing the oxygen partial pressure increases the oxidation rate of CuS.

The CuS oxidation reaction in the presence of $Fe^{2+}$, $Fe^{3+}$, $Cu^{2+}$ and oxygen is preferably carried out in the oxygen partial pressure range of 0.01 to 50.4 bar, and more preferably in the oxygen partial pressure range of 0.1 to 20 bar (Vitrisol® with $O_2$ regeneration).

Liquid oxygen, air, compressed air, and $O_2$ enriched air can be used to oxidize $Fe^{2+}$ and subsequently CuS with $Fe^{3+}$ (Vitrisol® with $O_2$ regeneration).

CuS is hydrophobic in nature. However, the CuS produced in the Vitrisol® absorption process is hydrophilic of character (also Broekhuis, 1992). Additionally, the density of CuS is lower than that of $H_2O$ due to the porous nature of the solids. However, CuS formed in the absorber forms a (semi-) suspension with Vitrisol. An experiment was performed with CuS from the Vitrisol absorber, that was washed that many times that no metal salts and $H_2SO_4$ remained in the pores. This CuS did not form a suspension with Vitrisol, it floated on the G/L interface. Therefore the conclusion can be made that salts in the CuS pores create the hydrophilic character of the CuS particles. Consequently it is required to assure that ions are always present at the CuS surface (including the pores). Therefore it is advised that the CuS particles are always kept in the Vitrisol® liquid, and that the CuS should be created by contacting $H_2S$ with Cu2+ ions in and aqueous liquid.

The suitable sulphur, and/or sulphur compound, solvent is at least one selected from the (halogenated) aliphatic and/or (halogenated) aromatic compounds group consisting of e.g. naphthalene, gasoline, diesel, N,N-dimethylaniline, benzene, toluene, p-xylene, m-xylene, o-xylene, cyclohexane, ethyl cyclohexane, dimethyl cyclohexane, halogenated alkanes (e.g. tetrachloroethane, chloroform), halogenated alkenes, n-alkanes, n-alkenes, branched alkanes, branched alkenes and carbon disulphide, and mixtures thereof.

The sulphur solvent can possibly partly dissolve in the Vitrisol® liquid. Therefore a downstream removal step for the dissolved sulphur solvent could be required.

A unique feature of the $H_2S$ absorption process, when using $Cu^{2+}$ for the removal of $H_2S$, is that deep removal can be obtained, even at low pH, though $H_2S$ is an acid gas. Additionally, adding a second polyvalent metal ion does not negatively influence the removal of $H_2S$ by $Cu^{2+}$.

The oxidation of CuS results in the formation of solid sulphur. However, at T=90° C. the decrease in oxidation rate does not appear to be resulting from mass transfer limitations due to the formation of a sulphur barrier on the CuS, but because the surface readily available for reaction decreases.

The Vitrisol® process with regeneration (either oxygen or $H_2O_2$) is flexible with respect to CuS conversion in the oxidation steps (as explained earlier in this document). Complete CuS conversion can be obtained in the oxidation process of CuS (Vitrisol® with $O_2$ regeneration).

The Vitrisol® process with regeneration (either oxygen or $H_2O_2$) can be operated with heat integration, i.e. the Vitrisol® liquid exiting the oxidation steps can heat up the Vitrisol® liquid entering the oxidation steps.

The overall oxidation reaction of $H_2S$ is given by:

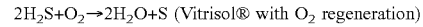

$$2H_2S + O_2 \rightarrow 2H_2O + S \text{ (Vitrisol® with } O_2 \text{ regeneration)}$$

Or

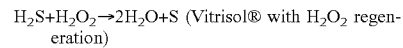

$$H_2S + H_2O_2 \rightarrow 2H_2O + S \text{ (Vitrisol® with } H_2O_2 \text{ regeneration)}$$

For every mole of sulphur formed, two moles of water are formed. Therefore, depending on the case and resulting process design, the water content in the process can either increase, decrease or remain equal (due to e.g. evaporation of water in the CuS).

EXPERIMENTATION & EXAMPLES

Experimentation 1: Vitrisol Absorber

The following examples of the cocurrent downflow Vitrisol® absorber, operated batchwise, illustrate the influence of the formation of CuS on the behaviour of the Vitrisol absorption liquid, the first order behaviour with respect to $H_2S$ removal and the observed characteristics of the CuS particles formed.

Experimental Setup Description $H_2S$ absorption experiments were executed in a cocurrent downflow Vitrisol® pilot absorber at a biogas production site. The absorber included a packed column placed on top of a Vitrisol® liquid storage vessel. The packing consisted of Pall rings. Gas- and liquid-samples were obtained at 4 points divided over the length of the packing. The inlet gas was sampled. A pump returned the absorption liquid from the storage vessel back to the top of the packed column. A biogas stream entered the column in the top and exited the column in the liquid storage section. The Vitrisol® absorption liquid was an aqueous solution containing copper sulphate, ferrous sulphate and sulphuric acid.

The absorber was operated with superficial gas velocities up to 1.2 m/s and superficial liquid velocities up to 0.012 m/s. $H_2S$ concentrations in the gas phase up to 6000 ppmV were processed. The absorber setup was operated at atmospheric pressure.

Influence of CuS on the Absorption Liquid Behaviour

It was observed that foaming occurred at CuS concentrations of the Vitrisol absorption liquid, exceeding 3 wt % to 5 wt %. Because of the rheological nature of the liquid, the absorption liquid could not be easily pumped. This halted the absorption process as no absorption liquid entered the top of the packed column.

First Order Behaviour with Respect to $H_2S$ Removal

Figure 7:
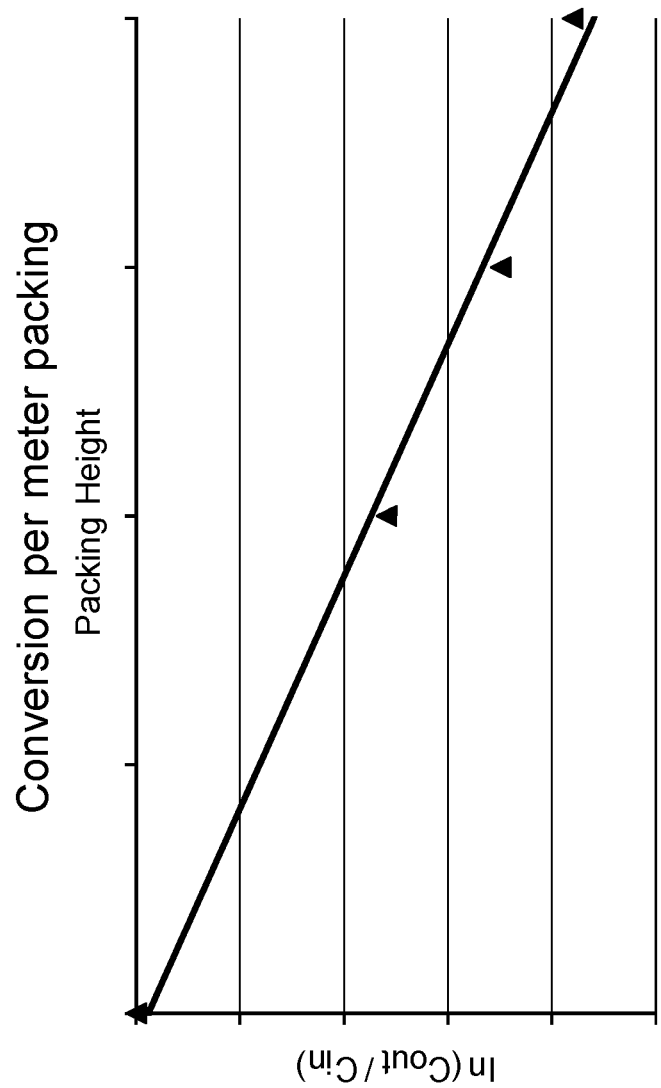
FIG. 7 is a graph of $\ln(C_{out}/C_{in})$ versus packing height.

FIG. 7 illustrates the first order behaviour with respect to $H_2S$ removal in the packed column. The y-axis shows the conversion, the x-axis the packing height.

Characteristics of CuS Particles Formed

The density of solid CuS is much higher than that of water. Based on this fact it was expected that CuS, formed during the absorption of $H_2S$, would sink. Furthermore, CuS is hydrophobic of nature. Therefore it was expected that, depending on the CuS particle size, a suspension would not be formed.

However, it was observed that the absorption liquid and CuS formed a homogeneous suspension when in motion. When left in a motionless state after motion, part of the CuS would sink slowly, and part of the CuS would float on the G/L interface. This behaviour is explained by the following analyses and observations.

The porosity of CuS was analyzed. The porosity of the CuS particles formed during $H_2S$ absorption appeared to have a porosity higher than 50%. The density of the CuS formed during the absorption process was determined to be lower than the density of water.

The particle size distribution was measured. The particle size distribution appeared to be ranging within 0.1 μm to 50 μm.

CuS obtained from the pilot absorber was separated and washed many times such that no Vitrisol liquid was present in the CuS. Afterwards, the CuS was dried. It was observed that the CuS, free of Vitrisol liquid, did not form a suspension with either water or Vitrisol liquid; i.e. the CuS remained afloat on the G/L interface. Therefore, it can be concluded that Vitrisol liquid, within the pores of the CuS solids, provides the hydrophilic character of the CuS formed in the $H_2S$ absorption process.

Due to high porosity and small particle size, a large CuS area can be readily available for oxidation by $Fe^{3+}$. This is a reason behind high leaching rates of CuS. Normally, in the copper ore industry, CuS ore is crushed to smaller particle size to reduce leaching times. However, leaching rates are still smaller compared to processes described herein resulting in higher leaching times. To enhance leaching rates, anions such as Cl— and/or Br— ions can optionally be added. However, such enhancements are not required for implementations of the present process, as CuS particles produced in such implementations have displayed superior characteristics with respect to leaching.

Experimentation 2: CuS Sedimentation

The following example with respect to sedimentation of CuS illustrates behaviour, as well as sedimentation velocities, of CuS in Vitrisol.

Experimental Setup Description

Sedimentation experiments were performed in a graduated cylinder. A Vitrisol solution containing CuS was added to the graduated cylinder. Vitrisol solution containing CuS was filtrated to obtain solids-free Vitrisol. After agitation, the sedimentation behaviour, as well as sedimentation speeds, were observed.

Sedimentation of End-of-Life Vitrisol

It was observed that end-of-life Vitrisol, i.e. Vitrisol containing a maximum amount of CuS at which a clear change in rheological behaviour of the liquid was observed, did not settle. The wt % of CuS in this end-of-life Vitrisol was 3 wt %.

Sedimentation of Diluted End-of-Life Vitrisol

In a subsequent experiment, the end-of-life Vitrisol was diluted with the same Vitrisol liquid, however being free of solids. The diluted Vitrisol contained 1 volume part end-of-life Vitrisol and 3 volume parts of solids-free Vitrisol.

Figure 14:
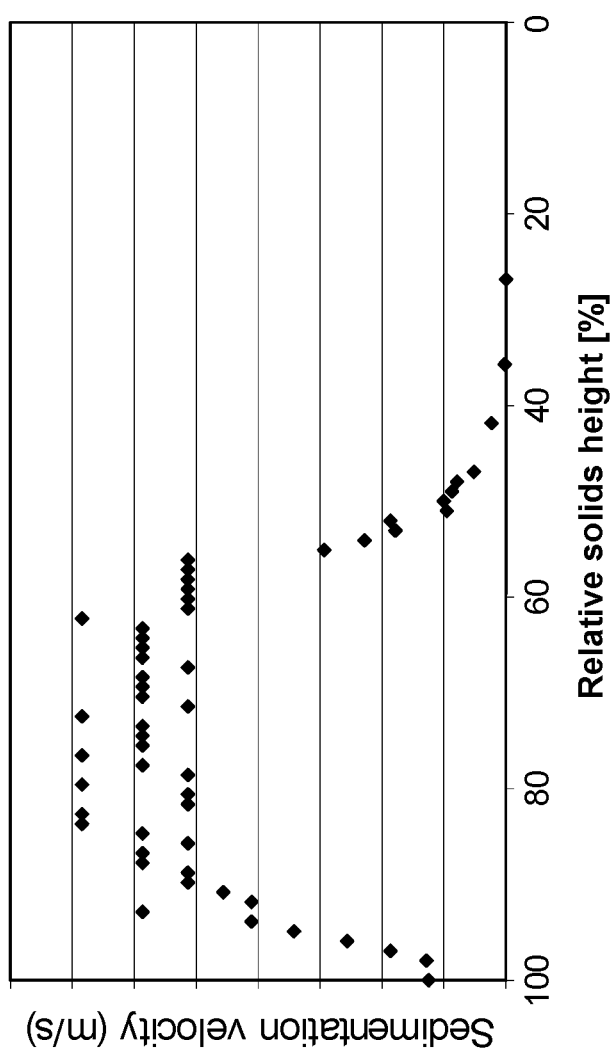
FIG. 14 is a graph of sedimentation velocity of CuS as a function of relative height of suspension.

It was observed that CuS, present in diluted end-of-life Vitrisol, settled towards the bottom. However, the CuS did not settle on the bottom. Rather, a bottom phase, with CuS in suspension, was formed. FIG. 14 illustrates the behaviour of the sedimentation velocity as a function of relative height of the suspension.

It can be concluded that, after dissolution, the suspension formed within the diluted end-of-life Vitrisol, after sufficient sedimentation time, nears the original solids content of the end-of-life Vitrisol. The solids content of the suspension, formed within the diluted end-of-life Vitrisol, was 2.7 wt %.

Furthermore, initially the sedimentation velocity increases towards a steady sedimentation velocity. After a certain solids content was reached, the sedimentation velocity decreased to zero.

It has been posited that changes in rheological behavior and the maximum wt % in which the CuS stays in suspension without agitation are linked. It should be noted that such rheological behavior, particle properties, and suspension properties can be used to aid in the design and operation of various units, such as the absorption unit, in order to mitigate potential problems associated with such solid particles. For example, problems associated with particles that tend to float can be mitigated by using a packed column in which the liquid phase flows as a film over the packing and thus prevents floating issues that could be problematic in other types of contactors in which the liquid is the continuous phase. In addition, counter-current gas-liquid flow can be used to mitigate high rates of solids formation that could occur in co-current scenarios. In addition, appropriate agitation can be provided for liquid-continuous contactors so as to keep the particles in suspension, if desired, and the agitation can be configured and operated based on whether the particles tend to float, for example.

Experimentation 3: CuS Separation from Absorption Liquid

The following examples with respect to the separation of CuS from the absorption liquid via filtration (candle filters) and centrifugation (decanter) will illustrate how CuS is separated based on two different processes.

Experimental Setup Description

Filtration experiments were executed in a pilot candle filter setup. The setup was operated such that the absorption liquid suspension, containing CuS formed by removing $H_2S$ in the pilot absorber, was pumped to a candle filter housing. In the candle filter housing was placed a candle filter. With the pump the pressure difference over the candle filter could be adjusted. The filtrate exited the candle filter housing through the candle filter. CuS particles formed a cake on the candle filter cloth. The cake was discharged by blow back of air. The dry matter content of the filter cake was determined by drying overnight at elevated temperatures.

Centrifugation experiments were executed in a pilot decanter setup. The setup was operated as such that absorption liquid suspension, containing CuS formed by removing $H_2S$ in the pilot absorber, was pumped to the decanter at varying velocities. The decanter was operated at different centrifugal speeds to investigate the solids content of the cake exiting the decanter. The dry matter content of the filter cake was determined by drying overnight at elevated temperatures.

Filtration

It was observed that CuS filter cakes could be obtained with a dry matter content ranging from 25 wt % to 40 wt %.

Centrifugation

It was observed that CuS decanter cakes could be obtained with a dry matter content ranging from 25 wt % to 50 wt %.

Experimentation 4: Centrifugation of Filter Cake

Filter cake obtained from filtration experiments described in Experimentation 3 was exposed to varying levels of gravitational force in a centrifuge to further increase the dry matter content of the cake.

Experimental Setup Description

A filter tube was placed inside a metal tube that fitted in a centrifuge. A filter paper was place in the filter tube, and afterwards CuS cake that was obtained from filtration experiments was placed in the filter tube on the filter paper. The filled metal tubes were exposed to varying rotational speeds inside the centrifuge, and consequently to varying gravitational forces. Afterwards, the mass of the cake, as well as Vitrisol liquid removed from the cake, were determined. Afterwards, the dry matter content of the CuS cake was determined by drying overnight.

Effect of Gravitational Force on CuS Filter Cake

A CuS filter cake with 32 wt % dry matter content was exposed to varying rotational speeds in a centrifuge. Table 1 shows the effect of the varying rotational speeds on Vitrisol liquid removal from the CuS cake and dry matter content.

TABLE 1

The effect of gravitational force on CuS filter cake

| Rotational speed [rpm] | G force [G] | dry matter content [wt % of resulting cake] | Vitrisol removed from initial cake [wt % of initial cake] |
|---|---|---|---|
| 5043 | 2417 | 41.6 | 31.6 |
| 10118 | 9729 | 54.3 | 48.0 |
| 20000 | 38012 | 54.7 | 58.0 |

It can be concluded from Table 1 that the dry matter content of the CuS cake is not linear with the gravitational force applied to the samples. Moreover, whereas the dry matter content is not varied much at higher rotational speeds, still a relatively large amount of Vitrisol liquid is removed from the cake.

An explanation of this phenomena is that the Vitrisol liquid itself contains a large amount of salts. Therefore the dry matter content of the Vitrisol liquid is relatively high (when water is evaporated). Consequently, the dry matter content of the resulting cake is not increased more pronounced at higher rotational speeds. However, as additional Vitrisol liquid is removed at higher rotational speeds, the content of CuS, of the dry matter content, increases.

Experimentation 5: $Fe^{2+}$ Oxidation

Batchwise $Fe^{2+}$ oxidation experiments were performed with and without $Cu^{2+}$ to evaluate the $Fe^{2+}$ oxidation behaviour and factors influencing the oxidation.

Experimental Setup Description $Fe^{2+}$ oxidation experiments were executed in a glass autoclave. The reactor was operated batchwise with regard to the liquid phase, and continuous with regard to the gas phase. Nitrogen could be fed in order to be able to remove oxygen from the setup. During the experiment, air was supplied to the reactor through a mass flow controller. A water saturator was used to humidify the gas phase and maintain the water balance. The pressure in the reactor was controlled with a back-pressure controller. A pressure relief valve was attached to the reactor as a safety precaution. The reactor temperature was regulated by a Julabo heater. A Büchi water bath heated the water saturator to the reactor temperature. A Teflon gas entrainment stirrer was used to obtain maximum gas dispersion in the liquid phase. The stirrer was operated with a magnetic drive. Glass baffles were introduced in the reactor to promote mixing. The steel interior of the reactor was protected by Teflon. Sampling was performed through Teflon tubing and Teflon valves. Cuvettes were used to collect samples. A UV-Vis spectrophotometer was used to analyze sample compositions. Temperature in the reactor was monitored with a Teflon-protected PT-100, temperature in the water saturator was registered with a regular PT-100. The pressure inside the experimental setup was measured with a pressure sensor.

Concentration Profiles

Figure 8:
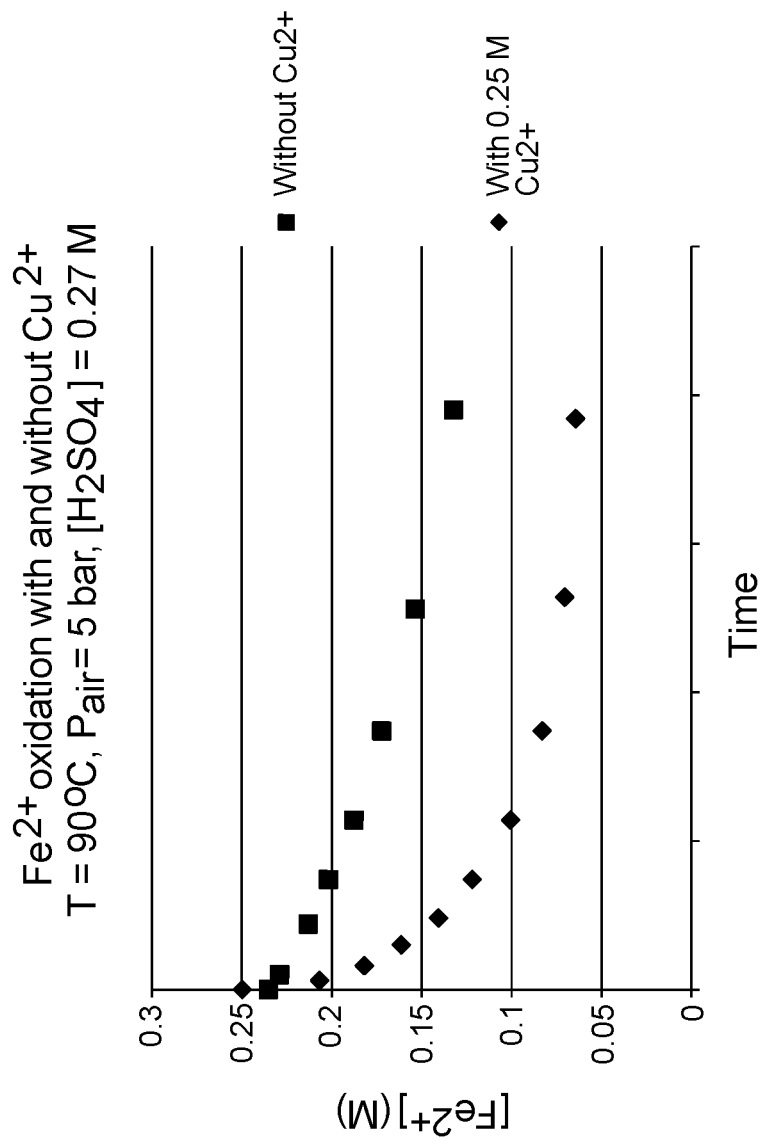
FIG. 8 is a graph of $Fe^{2+}$ concentration versus time.

FIG. 8 shows $Fe^{2+}$ concentration profiles for the oxidation of $Fe^{2+}$ with and without $Cu^{2+}$. It can be concluded that the presence of $Cu^{2+}$ increases the $Fe^{2+}$ oxidation rate. The increased rate of $Fe^{2+}$ oxidation is more pronounced initially. It can be assumed that $Fe^{3+}$ has a negative influence on the $Fe^{2+}$ oxidation rate.

Figure 9:
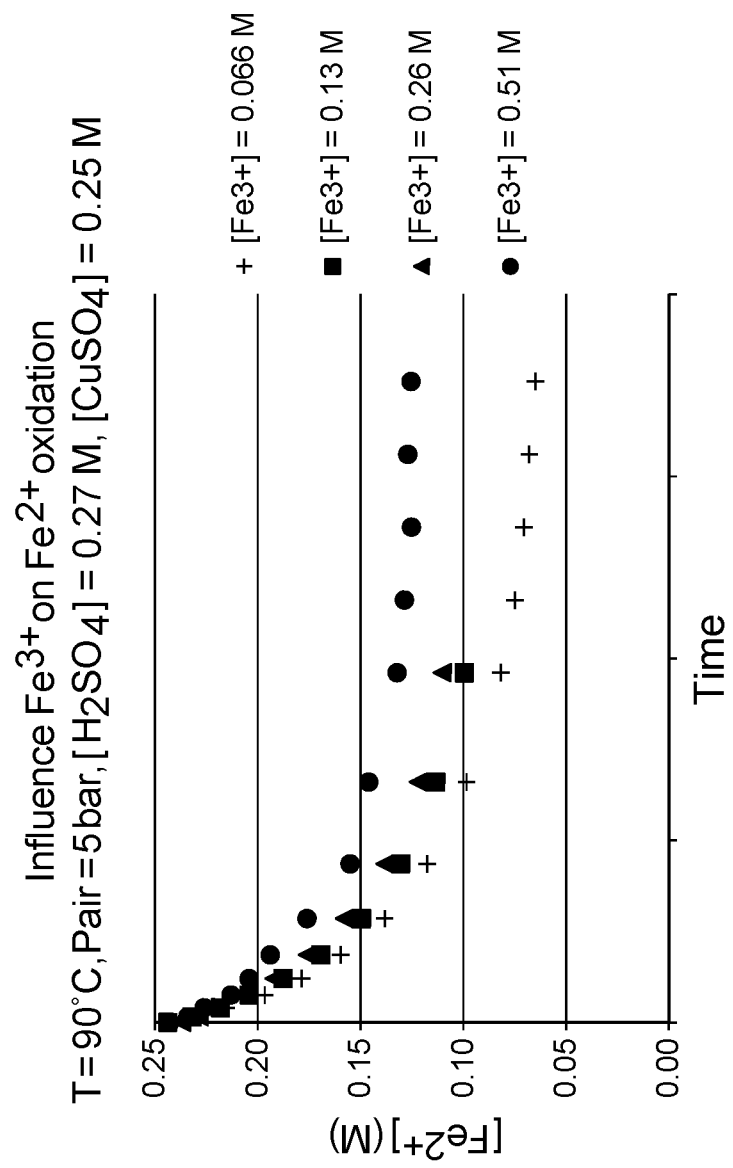
FIG. 9 is another graph of $Fe^{2+}$ concentration versus time.

This assumption was verified experimentally: FIG. 9 shows $Fe^{2+}$ concentration profiles for the oxidation of $Fe^{2+}$ in the presence of $Cu^{2+}$ and varying initial concentrations of $Fe^{3+}$. FIG. 8 clearly illustrates the negative influence of $Fe^{3+}$ on the $Fe^{2+}$ oxidation rate in the presence of $Cu^{2+}$.

Experimentation 6: CuS Oxidation

A variety of experiments were performed to investigate the oxidation behaviour of CuS. In the experiments, CuS was used obtained from the Vitrisol® pilot absorber described in Experimentation 1. One type of experiment involved the batchwise oxidation of CuS in the presence of $Fe^{2+}$ and $O_2$, the gas phase being operated continuously. This type of experiments was executed to investigate the overall oxidation reaction of both $Fe^{2+}$ with $O_2$ and subsequently CuS with $Fe^{3+}$, to simulate the oxidizer operation in a continuous process. Additionally, the effect of turning off the gas flow during an oxidation experiment before 100% CuS conversion, and adding a nonpolar sulphur solvent to the reactor, was investigated. It was determined whether this influenced the CuS oxidation behaviour. Another type of experiments involved determining whether the formed sulphur, after oxidation of CuS, was in a (partially) dissolved or (partially) solid state.

Experimental Setup Description

CuS oxidation experiments were executed in the experimental setup described in Experimentation 3: $Fe^{2+}$ oxidation. However, a different method of sampling was performed. Before sampling, the stirrer was turned off and the pressure relieved. First a syringe was used to obtain a sample, after which the sample was pushed through a filter to obtain a liquid sample without solids. A UV-Vis spectrophotometer was used to analyze sample compositions.

Sulphur formed, after fully converting CuS, was separated by filtration. Afterwards, both the solid phase and the liquid phase were separately extracted with a nonpolar solvent to dissolve sulphur. Afterwards, the nonpolar solvent was left to evaporate on a petri disk. If sulphur would be present, it would crystallize out.

CuS Conversion Profiles

It was observed during the CuS oxidation experiments that both the $Cu^{2+}$, as well as the $Fe^{3+}$ concentration, increased. Therefore one oxidation experiment was performed by turning off the gas flow at that point that enough $Fe^{3+}$ was present to fully convert the remainder of the CuS. P-xylene was added to the reactor to dissolve sulphur when the gas flow was turned off.

Figure 10:
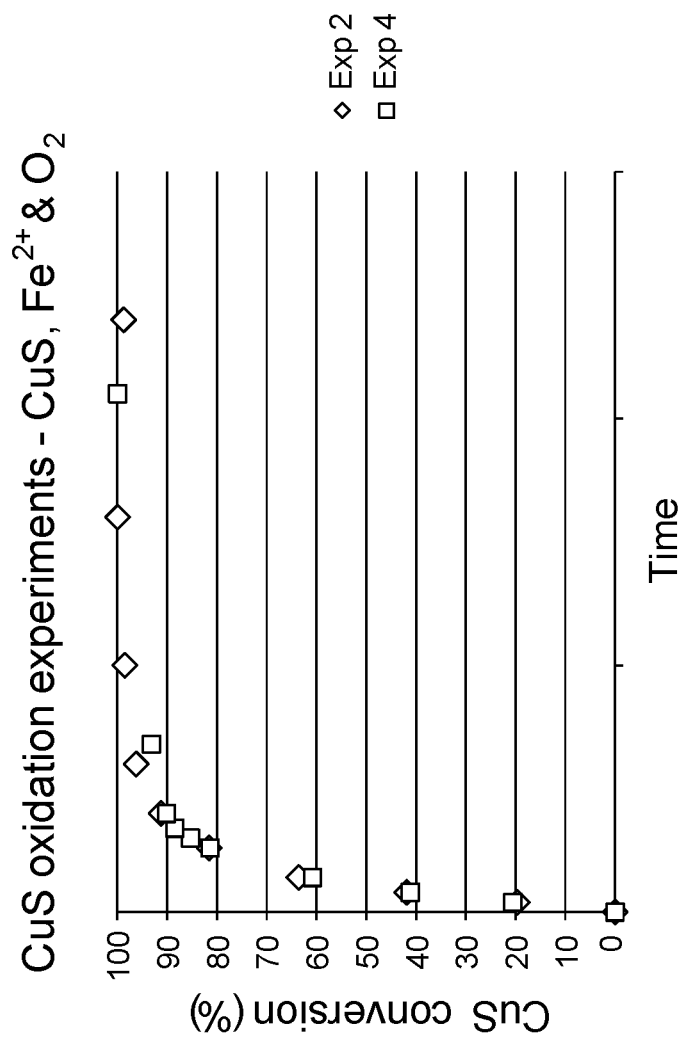
FIG. 10 is a graph of CuS conversion percentage versus time.

FIG. 10 illustrates the conversion profiles of both CuS experiments. FIG. 10 shows conversion profiles of CuS oxidation experiments 2 and 4 with equal experimental settings. During experiment 4, at point 5 (81% CuS conversion), the gas flow was turned off and subsequently an excess of nonpolar solvent was added to the reactor. FIG. 10 clearly illustrates that when enough $Fe^{3+}$ is present in the liquid phase for full conversion of CuS, additional production of $Fe^{3+}$ is not required to speed up the oxidation of CuS. Moreover, initially the CuS oxidation proceeds at a relative high rate compared to the CuS conversion between 80% and 100%. It was observed that sulphur remains in the solid state. It was assumed that sulphur formed a barrier on the CuS, and that because of this additional mass transfer resistance the oxidation of CuS slowed down. However, FIG. 10 clearly illustrates that the addition of a nonpolar sulphur solvent did not speed up the oxidation of CuS. Therefore the theorem can be postulated that the CuS oxidation slows down due to a decline in solids area readily available for oxidation by $Fe^{3+}$.

Sulphur Extraction

It was observed that no sulphur was extracted from the liquid phase. All the sulphur was extracted from the solid phase. Therefore it can be concluded that no sulphur dissolves in the liquid phase.

Experimentation 7: Electrochemical Oxidation of CuS

A variety of experiments were performed to investigate the indirect electrochemical oxidation behaviour of CuS. Copper sulphide cannot be oxidized directly; instead $Fe^{2+}$ is electrochemically oxidized to $Fe^{3+}$ at the anode, and subsequently $Fe^{3+}$ oxidizes the metal sulphide. Protons are reduced at the cathode forming hydrogen. E.g. copper plating of the cathode, i.e. $Cu^{2+}$ reduction at the cathode, is prevented by use of a suitable membrane (e.g. a bipolar membrane, a nanofiltration membrane or an ion-selective membrane).

Experimental Setup Description

Electrochemical oxidation experiments were performed in an electrochemical cell. The electrochemical cell consisted of two compartments, i.e. an anode and a cathode compartment, which are separated by a membrane. Liquids can flow through each compartment either cocurrently or countercurrently. The function of the membrane is to transfer protons ($H_3O^+$) and to retain multivalent ions in solution ($Fe^{2+}$, $Fe^{3+}$, $Cu^{2+}$ and $SO_4^{2-}$) and solids (CuS, S). Cation exchange membranes, anion exchange membranes and bipolar membranes were tested.

The electrochemical cell, or electrodialysis cell, was developed and will be described here-below. The membrane area was slightly larger than the electrode area. A spacer was placed between the membrane and the electrode in both the anode, as well as the cathode compartment. Both the anode and cathode electrodes were graphite electrodes. The electrodialysis cell was operated countercurrently with two separate pumps. A bench power supply was used to apply voltage over the anode and cathode electrodes. A UV-Vis spectrophotometer was used to determine solution compositions.

The anode solution consisted of a ferrous sulphate solution containing sulphuric acid. The cathode solution either contained demineralized water, of a sulphuric acid solution, depending on the membrane. When experiments were performed with ion exchange membranes a sulphuric acid solution was required to counteract the osmotic pressure over the membrane. In case of a bipolar membrane the use of demineralized water was sufficient, because this type of membrane exhibits low permeability. When a potential difference is applied over the membrane, the catalytic active intermediate layer of the bipolar membrane dissociates water to $H_3^+$ and $OH^-$. The protons produced move to the cathode, the hydroxide ion move to the anode. pH and temperature of the liquid flowing through the anode and cathode compartment were measured. The anode and cathode compartment solutions were in open contact with surroundings to prevent pressure build-up due to possible hydrogen formation. Oxidation of $Fe^{2+}$ because of oxygen was prevented with a nitrogen blanket. First the oxidation behaviour of $Fe^{2+}$ to $Fe^{3+}$ in the electrochemical cell was determined. Afterwards experiments were performed in which CuS was added.

$Fe^{2+}$ Permeability

It was observed that when no potential difference was applied, anion exchange membranes exhibited a lower permeability for $Fe^{2+}$ compared to cation exchange membranes.

Figure 11:
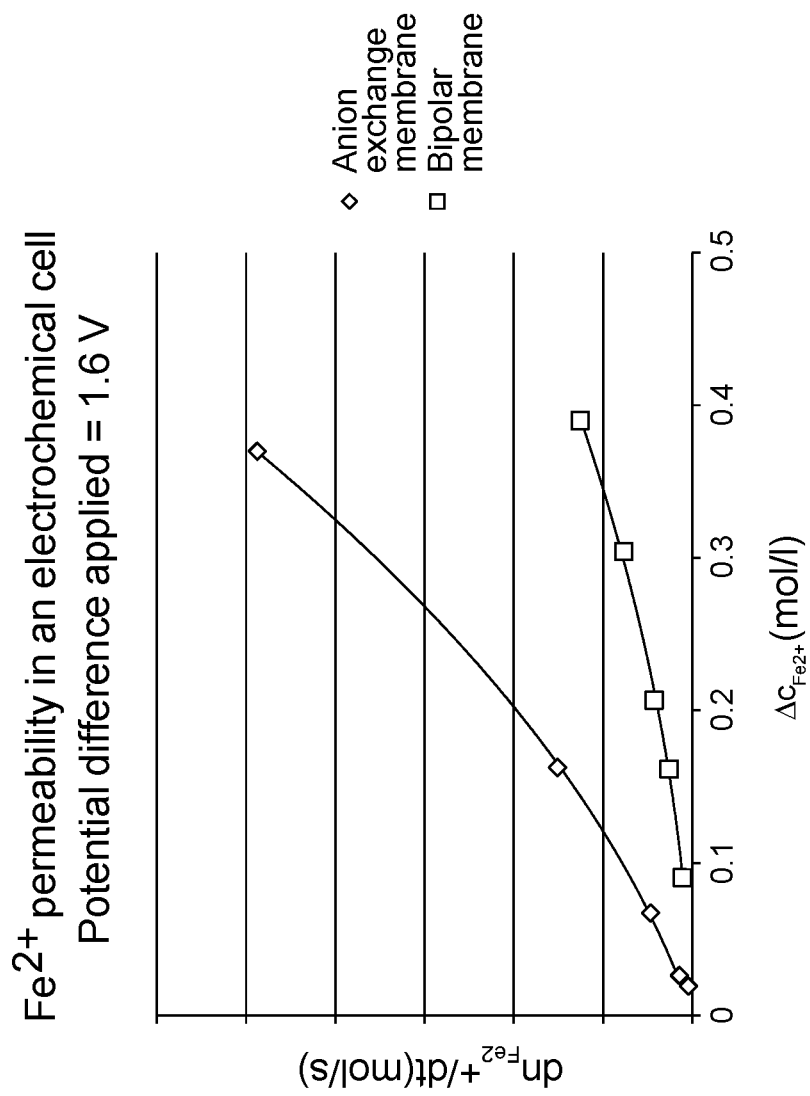
FIG. 11 is a graph of $Fe^{2+}$ permeability of two different types of membrane tested separately in an electrochemical cell.

It was observed, under equal experimental settings, that the bipolar membrane exhibited a lower metal ion permeability compared to the anion exchange membrane at equal experimental settings, as is illustrated in FIG. 11. The same experimental solutions were applied in both experiments; i.e. a solution containing $FeSO_4$ and $H_2SO_4$ for the anode compartment, and a solution containing $H_2SO_4$ for the cathode compartment. Both experiments were performed at ambient conditions. FIG. 10 shows $Fe^{2+}$ permeability in an electrochemical cell with an anion exchange membrane and bipolar membrane under ambient conditions and equal experimental settings, with a potential difference applied of 1.6 V. It was observed that the $Fe^{2+}$ permeability was constant, and became independent of the $Fe^{2+}$ concentration difference over anode and cathode compartments, for the bipolar membrane when a high potential difference was applied (above 15 V).

$Fe^{2+}$ Oxidation

Figure 12:
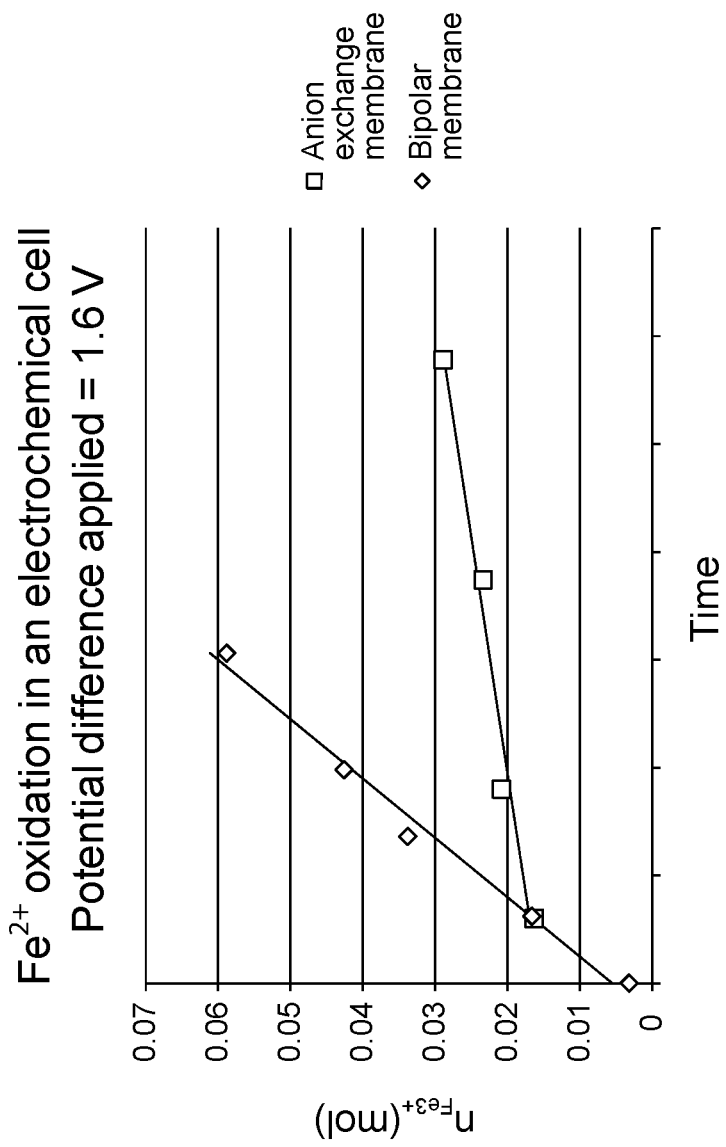
FIG. 12 is a graph of $Fe^{3+}$ production in an electrochemical cell for two different types membranes tested separately.

It was observed that when a potential difference was applied, gas was formed at the cathode side of the electrochemical cell for both the bipolar membrane as well as the anion exchange membrane. Moreover, it was observed that the $Fe^{2+}$ oxidation rate was higher when using a bipolar membrane compared to an anion exchange membrane at equal experimental settings, as is illustrated in FIG. 12. The same experimental solutions were applied in both experiments; i.e. a solution containing $FeSO_4$ and $H_2SO_4$ for the anode compartment, and a solution containing $H_2SO_4$ for the cathode compartment. Both experiments were performed at ambient conditions. FIG. 12 shows $Fe^{3+}$ production in an electrochemical cell with an anion exchange membrane and bipolar membrane under ambient conditions and equal experimental settings. Potential difference applied of 1.6 V.

CuS Oxidation

An additional experiment was performed by adding a Vitrisol® solution, obtained from the Vitrisol® pilot absorber described in Experimentation 1, containing 4 wt % of CuS to the anode section of the electrochemical cell. A bipolar membrane was used, the experiment was performed under ambient conditions, and a potential difference above 15 V was applied. Before the start of the experiment both $Fe^{2+}$ and $Fe^{3+}$ were present in the anode compartment.

It was observed that the current density was higher when CuS solids were added to the anode section. Moreover, it was observed that the hydrogen gas production declined after a prolonged period of operation time. However, at this point the current density remained constant. It was clearly observed that solid copper was deposited on the cathode electrode. The potential difference applied was large enough to deposit iron on the electrode, however, solid iron was not visible on the electrode.

Experimentation 8: Sulphur Dissolution

A variety of experiments were performed to investigate the solubility of sulphur in various nonpolar solvents.

Experimental Setup Description

Dissolution experiments were performed in a three-necked round bottom flask. Temperature was controlled inside the round bottom flask. Stirring was performed with a magnetic stirrer. A condenser was connected to the round bottom flask to condense nonpolar solvent vapours. Samples were taken with syringes and ejected on petri disks to evaporate the nonpolar solvent.

Sulphur solubilities were obtained by increasing the temperature from 30° C. to 90° C., by decreasing the temperature from 90° C. to 30° C. and by fluctuating the temperature between 30° C. and 90° C.

Sulphur Solubility

Figure 13:
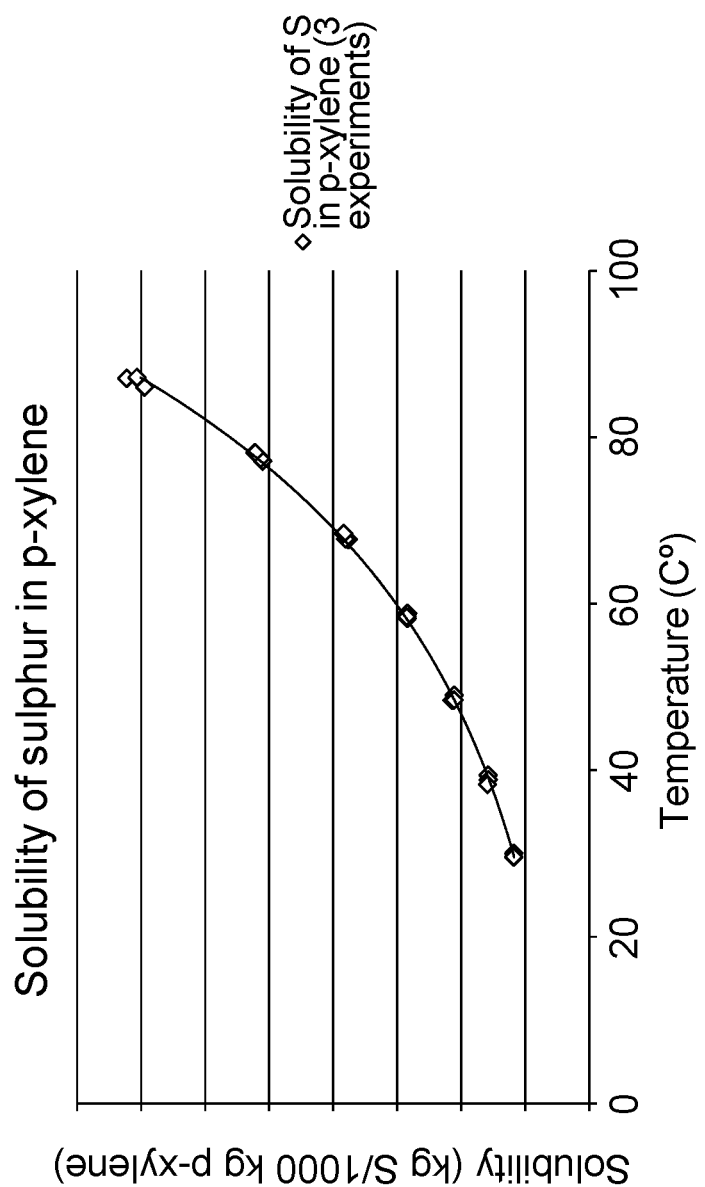
FIG. 13 is a graph of solubility in p-xylene versus temperature.

It was observed during the experiments that the sulphur solubility increased with temperature. An example of a sulphur solubility curve with p-xylene as nonpolar solvent is illustrated in FIG. 13.

Experimentation 9: Vitrisol® Process Simulation

Conceptual designs of the Vitrisol® process were developed for several low pressure gas and high pressure gas cases with varying $H_2S$ concentration. Simulations of these different conceptual designs were performed. Notable outcomes were the following:

The varying of possible unit operations of the oxidizer step for Vitrisol® with regeneration. A bubble column as oxidizer appears to be sufficient for the regeneration of low amounts of CuS, whereas a gas-liquid contactor with high intensity stirring is preferred when large amounts of CuS have to be regenerated. Therefore, it can be stated that the most optimal oxidizer design is strongly case dependent.

The varying of possible unit operations for the removal of sulphur from the Vitrisol® process with regeneration. Saturating a batch of nonpolar solvent, and periodically crystallizing out sulphur by cooling to surroundings, is one of the preferred alternatives for low amounts of sulphur, whereas a crystallizer is preferred when large amounts of sulphur need to be crystallized continuously. Therefore, it can be stated that the most optimal sulphur recovery steps are also strongly case dependent.

While the processes and systems were generally described in relation to $H_2S$ removal, it should be understood that various other sulphur contaminants present in a gas stream could be treated and removed using implementations of the processes and systems. In addition, Cu and Fe are described as the preferred metals which in ionic form are used in certain implementations of the processes and systems described herein, but it should be noted that other appropriate metal ions may be used.

The invention claimed is:

1. A process for removing sulfur compounds from a sulfur-containing gas stream, comprising:
in an absorption stage, contacting the sulfur-containing gas stream with an absorption solution comprising a metal cation capable of reacting with the sulfur compound to form a metal sulphide precipitate and/or a metal mercaptide precipitate, thereby producing a sulfur-depleted gas stream and a precipitate-enriched solution;
recycling the precipitate-enriched solution back to the absorption stage, thereby accumulating metal sulphide precipitates in the absorption solution; and
controlling a concentration of the metal sulphide precipitates present in the absorption solution below a threshold in order to maintain rheological properties of the absorption solution in the absorption stage, wherein the threshold is 5 wt % or wherein the process includes adding a surface active agent to the absorption solution in order to raise the threshold compared to no surface active agent.

2. The process of claim 1, wherein the gas flow comprises shale gas, process gas, natural gas, or biogas.

3. The process of claim 2, wherein the metal which precipitates as a metal sulphide is Fe, Zn or Cu.

4. The process of claim 3, wherein the absorption solution comprises an acid and is placed into contact with the gas flow in the form of an acidic aqueous metal salt solution.

5. The process of claim 4, wherein the acidic aqueous metal salt solution is chosen from the group consisting of a solution of metal nitrates, sulphates, phosphates, sulphites, nitrites, chlorides, bromides, iodides, fluorides, pyrophosphates and perchlorates.

6. The process of claim 5, wherein, when the metal is solely copper, a pH of about 7.7 or less is maintained; wherein, when the metal is solely zinc, a pH of about 6 or less is maintained; or wherein, when the metal is solely iron, a pH of about 6.0 or less is maintained.

7. The process of claim 6, wherein a starting pH on initially placing the gas flow in contact with the acidic aqueous metal salt solution is above −1.0.

8. The process of claim 7, wherein the threshold is 3 wt %.

9. The process of claim 1, wherein the metal sulphide precipitates are formed as particles under conditions such that the particles have a porosity of at least 50% and have a size, density and hydrophilicity sufficient to remain in suspension in the solution.

10. The process of claim 1, wherein the absorption solution further comprises a second metal ion capable of changing in valence state under the influence of oxidation; and wherein the process further comprises:
subjecting the solution comprising the metal sulphide precipitates to regeneration to produce a regenerated solution, the regeneration comprising:
adding an oxidizer to the solution comprising the metal sulphide precipitates, to increase the valence of the second metal ion; and
reacting the second metal ion in the higher valence state, with the metal sulphide precipitates; and
returning at least a portion of the regenerated solution to form at least part of the solution contacted with the gas flow.

11. The process of claim 10, wherein the metal cation comprises Cu and the second metal ion comprises Fe.

12. A method for selectively removing sulphur and/or sulphur containing contaminant compounds from a gas flow, comprising:
placing the gas flow into contact with a preselected metal ion solution, comprising either one metal ion, or a mixture of metal ions, at a pH lying in a range between a lower pH limit of about −1.0 and an upper pH limit of about 7.7, wherein the metal ion and the contaminants react together in order to form a solid metal salt of the contaminants which precipitates wherein the lower pH limit of about −1.0 substantially ensures that the metal salt formed between the metal ion and the contaminants substantially exclusively is precipitated, and wherein the upper pH limit substantially ensures that non-contaminants are not precipitated out of the gas flow as metal salts; and
controlling a concentration of the solid metal salt present in the solution below a threshold in order to maintain rheological properties of the solution, wherein the threshold is 5 wt % or wherein the method includes adding a surface active agent to the absorption solution in order to raise the threshold compared to no surface active agent.

13. The method of claim 12, wherein the gas flow contains $H_2S$, COS and mercaptans as at least a portion of the sulfur compounds.

14. The method of claim 13, wherein the gas flow further comprises $CO_2$, and is shale gas, process gas, natural gas, or biogas.

15. The method of claim 12, wherein the metal, which precipitates as a metal sulphide, is Fe, Zn or Cu.

16. The method of claim 15, wherein the metal ion or the mixture of metal ions and an acid are used to form an acidic aqueous salt solution as the preselected metal ion solution that is placed into contact with the gas flow.

17. The method of claim 16, wherein the acidic aqueous metal salt solution is chosen from the group consisting of a solution of metal nitrates, sulphates, phosphates, sulphites, nitrites, chlorides, bromides, iodides, fluorides, pyrophosphates and perchlorates.

18. The method of claim 17, wherein, when the metal is solely copper, a pH in the range between about −1.0 and about 7.7 is maintained; wherein, when the metal is solely zinc, a pH of about 6 or less is maintained; or wherein, when the metal is solely of iron, a pH in the range between about −1.0 and about 6.0 is maintained.

19. The method of claim 18, wherein the acidic aqueous metal salt solution is a solution of metal sulphates.

20. The method of claim 18, wherein the preselected metal ion solution further comprises a second metal ion capable of changing in valence state under the influence of oxidation; and wherein the method further comprises:
subjecting the solution comprising the solid metal salt to regeneration to produce a regenerated solution, the regeneration comprising:
adding an oxidizer to the solution comprising the solid metal salt, to increase the valence of the second metal ion; and
reacting the second metal ion in the higher valence state, with the metal salt metal sulphide precipitates and/or the metal mercaptide precipitates to produce metal cations and sulphides and/or mercaptides; and
returning at least a portion of the regenerated solution to form at least part of the solution contacted with the gas flow; and
wherein the metal ion comprises Cu and the second metal ion comprises Fe.

* * * * *